(12) United States Patent
Shibata et al.

(10) Patent No.: US 10,706,331 B2
(45) Date of Patent: Jul. 7, 2020

(54) TASK EXECUTION SYSTEM, TASK EXECUTION METHOD, TRAINING APPARATUS, AND TRAINING METHOD

(71) Applicant: OMRON Corporation, Kyoto-shi, Kyoto (JP)

(72) Inventors: Yoshiya Shibata, Ibaraki (JP); Yoshihisa Minato, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 99 days.

(21) Appl. No.: 15/956,803

(22) Filed: Apr. 19, 2018

(65) Prior Publication Data

US 2018/0330200 A1    Nov. 15, 2018

(30) Foreign Application Priority Data

May 9, 2017  (JP) .................. 2017-093222

(51) Int. Cl.
*G06K 9/00*  (2006.01)
*G06K 9/62*  (2006.01)
(Continued)

(52) U.S. Cl.
CPC ............. *G06K 9/6268* (2013.01); *G06F 9/44* (2013.01); *G06K 9/00288* (2013.01); (Continued)

(58) Field of Classification Search
CPC ............. G06K 9/6268; G06K 9/00288; G06K 9/6254; G06F 9/44; G06N 3/04; (Continued)

(56) References Cited

U.S. PATENT DOCUMENTS

2004/0028276 A1   2/2004  Okuda et al.
2016/0266942 A1*  9/2016  Grobelny .............. G06F 9/4843
(Continued)

FOREIGN PATENT DOCUMENTS

JP        3978098 B2    9/2007
JP        2017-20135 A  1/2017

OTHER PUBLICATIONS

The extended European search report (EESR) dated Aug. 29, 2018 in a counterpart European patent application.

*Primary Examiner* — Ping Y Hsieh
(74) *Attorney, Agent, or Firm* — Metrolex IP Law Group, PLLC

(57) ABSTRACT

A system that uses a learning module to realize execution of a predetermined task includes: a first input unit configured to receive information acquired from one or more external systems, and generate at least a portion of information to be input to the learning module; an output unit configured to acquire information output from the learning module, and generate information to be output from the system, the information output from the system being information based on which execution of a predetermined task is to be realized; and a second input unit configured to receive an input from a user so that information based on the input from the user is input to at least one of the first input unit, the learning module, and the output unit, and information output from the output unit varies based on the input from the user.

14 Claims, 21 Drawing Sheets

(51) Int. Cl.
  *G06N 20/00* (2019.01)
  *G06F 9/44* (2018.01)
  *G06N 3/04* (2006.01)
  *G06N 3/08* (2006.01)
  *G06T 1/00* (2006.01)
  *G06T 7/00* (2017.01)

(52) U.S. Cl.
  CPC .............. *G06K 9/6254* (2013.01); *G06N 3/04* (2013.01); *G06N 3/08* (2013.01); *G06N 20/00* (2019.01); *G06T 1/0014* (2013.01); *G06T 7/001* (2013.01); *G06T 2207/20081* (2013.01); *G06T 2207/20084* (2013.01)

(58) Field of Classification Search
  CPC ......... G06N 3/08; G06T 1/0014; G06T 7/001; G06T 2207/20081; G06T 2207/20084
  See application file for complete search history.

(56) References Cited

U.S. PATENT DOCUMENTS

2017/0076194 A1* 3/2017 Versace .................. G06N 3/008
2018/0120843 A1* 5/2018 Berntorp ............ G06K 9/00791

* cited by examiner

FIG. 6

| INPUT | CRITERION 1 | CRITERION 2 | CRITERION 3 |
|---|---|---|---|
| IMAGE 1 | GOOD | GOOD | GOOD |
| IMAGE 2 | GOOD | GOOD | BAD |
| IMAGE 3 | GOOD | BAD | BAD |
| IMAGE 4 | BAD | BAD | BAD |
| IMAGE 5 | BAD | BAD | BAD |
| ... | ... | ... | ... |

FIG. 8

| MOVEMENT DIRECTION | MEANING OF OPERATION | GRIPPING SUCCESS RATE | CONSTRAINT SATISFACTION LEVEL | EVALUATION VALUE |
|---|---|---|---|---|
| (0, 0, 0) | NO MOVEMENT | 0.4 | 1 | 0.4 |
| (0, 1, 0) | ← | 0.7 | 0 | 0 |
| (0, -1, 0) | → | 0.2 | 1 | 0.2 |
| (-1, 0, 0) | ↓ | 0.2 | 1 | 0.2 |
| (1, 0, 0) | ↑ | 0.9 | 0 | 0 |
| (0, 0, 0.5) | ROTATE BY 90° | 0.6 | 1 | 0.6 |
| ... | ... | ... | ... | ... |

FIG. 9

| | CONDITION | OPERATION |
|---|---|---|
| 1 | EVALUATION VALUES WHEN ROBOT HAND DOES NOT MOVE ARE NO SMALLER THAN 0.9 | INSTANTLY CLOSE GRIPPER |
| 2 | 1 IS NOT SATISFIED, AND WHEN ROBOT HAND MOVES, ALL EVALUATION VALUES ARE NO GREATER THAN 0.5 | THERE IS NO PROMISING OPERATION LIFT UP HAND AND RESET OPERATION CANDIDATES |
| 3 | 1 AND 2 ARE NOT SATISFIED | MOVE IN DIRECTION THAT MAXIMIZES SUCCESS RATE |

FIG. 11A

| MOVEMENT DIRECTION | MEANING OF OPERATION | GRIPPING SUCCESS RATE |
|---|---|---|
| (0, 0, 0) | NO MOVEMENT | 0.4 |
| (0, 1, 0) | ↑ | 0.7 |
| (0, −1, 0) | ↓ | 0.2 |
| (−1, 0, 0) | ← | 0.2 |
| (1, 0, 0) | → | 0.9 |
| (0, 0, 0.5) | ROTATE BY 90° | 0.6 |
| ... | ... | ... |

FIG. 11B

| MOVEMENT DIRECTION | MEANING OF OPERATION | CONSTRAINT SATISFACTION LEVEL |
|---|---|---|
| (0, 0, 0) | NO MOVEMENT | 1 |
| (0, 1, 0) | ↑ | 0 |
| (0, −1, 0) | ↓ | 1 |
| (−1, 0, 0) | ← | 1 |
| (1, 0, 0) | → | 0 |
| (0, 0, 0.5) | ROTATE BY 90° | 1 |
| ... | ... | ... |

FIG. 15

| SHAFT | v1 | v2 | v3 | v4 | v5 | ... |
|---|---|---|---|---|---|---|
| 1 | ↑ | → | ∅ | ∅ | ∅ | ... |
| 2 | ∅ | ∅ | ↑ | → | ∅ | ... |
| 3 | ∅ | ∅ | ∅ | ∅ | ↑ | ... |
| 4 | ∅ | ∅ | ∅ | ∅ | ∅ | ... |
| 5 | ∅ | ∅ | ∅ | ∅ | ∅ | ... |
| 6 | ∅ | ∅ | ∅ | ∅ | ∅ | ... |
| VOIDANCE SUCCESS RATE | 0.2 | 0.8 | 0.7 | 0.3 | 0.5 | ... |
| TARGET DEVIATION RATE | 0.8 | 0.5 | 0.3 | 0.2 | 0.7 | ... |

TARGET VECTOR {$u_0$}
STATE VECTOR {$p_0, v_0, p_1, v_1, p_2, v_2, p_3, v_3$}
AVOIDANCE ACTION { ↑ , ↓ , ←, →, $\phi$ }

FIG. 19

| | MATCHING LEVEL | WEIGHT |
|---|---|---|
| EYES | 0.3 | 1.0 |
| MOUTH | 0.5 | 1.0 |
| HAIR STYLE | 0.6 | 0.2 |
| FACE CONTOUR | 0.2 | 0.5 |
| ... | ... | ... |

TASK EXECUTION SYSTEM, TASK EXECUTION METHOD, TRAINING APPARATUS, AND TRAINING METHOD

CROSS-REFERENCES TO RELATED APPLICATION

This application claims priority to Japanese Patent Application No. 2017-093222 filed May 9, 2017, the entire contents of which are incorporated herein by reference.

FIELD

The disclosure relates to a system that realizes execution of a task, a method for realizing execution of a task, and a training apparatus and a training method for the same.

BACKGROUND

Conventionally, it is known that machine learning technology including a neural network is used to control a system to cause the system to execute a predetermined task. For example, JP 2017-20135A discloses that machine learning is applied to the picking of grip-target objects that are piled up in bulk, so that target objects with a high gripping success rate are learnt, and picking is performed. Also, for example, JP 3978098B2 discloses that machine learning (with a rule-based classifier) is applied to classification processing that is performed to determine whether or not samples have a defect, using captured images, and a user sets the configuration of the classifier, in advance of learning.

JP 2017-20135A and JP 3978098B2 are examples of background art.

SUMMARY

At a work site, there are cases where conditions such as requirements and constraint conditions concerning work, which are unique to every site, are adjusted during the execution of work, according to accuracy, execution speed, failure tolerance, and so on that are required when work is executed. However, with a system that uses a trained model to realize execution of a predetermined task (hereinafter also referred to as "work"), operations of the system are determined based on inputs from devices such as sensors so that work is performed. Therefore, in order to make adjustments according to the conditions of work, it is necessary to re-train the trained model, and it is impossible to adjust the conditions during the execution of work.

Therefore, one or more aspects aim to provide technology for allowing a user to make adjustments according to the conditions of work, during the execution of work, in cases where a system realizes execution of a predetermined task using a learning module that includes a trained model or a model that is equivalent to the trained model.

Provided is a system for executing a predetermined task, the system including: a learning module including a trained model that has been subjected to predetermined training through machine learning or a model that is equivalent to the trained model in terms of an input-output relationship; a first input unit configured to receive information that is acquired from one or more external systems, and generate at least a portion of information that is to be input to the learning module; an output unit configured to acquire information that is output from the learning module, and generate information that is to be output from the system, the information output from the system being information based on which execution of a predetermined task is to be realized; and a second input unit configured to receive an input from a user so that information that is based on the input from the user is input to at least one of the first input unit, the learning module, and the output unit, and information that is output from the output unit varies based on the input from the user.

According to this aspect, when the system is caused to execute a predetermined task, using a learning module that includes a trained model or a model that is equivalent to the trained model, information that is to be output varies based on not only information acquired from an external system such as a sensor, but also information that is input by a user. Thus, by inputting a condition for a task during the execution of work, the user can acquire an output that has been adjusted according to the condition, without re-training the learning module. As a result, the user can realize high-speed execution of a task that satisfies a desired condition.

In the system according to one or more embodiments, the second input unit may receive a condition regarding the predetermined task from the user, and the output unit may output information that is based on the condition. According to this aspect, the user can flexibly set a condition corresponding to a condition for a task, during the execution of work. Therefore, it is possible to adjust an output according to the details of work. As a result, when a task that involves a trade-off relationship between the accuracy of work and a processing speed is to be executed, for example, it is possible to flexibly perform adjustment according to the details of work during the execution of work so that, for example, accuracy is regarded as more important, or the processing speed is regarded as more important, without re-training the learning module.

In the system according to one or more embodiments, the information output from the output unit may partially include information that is to be presented to a user according to the condition. According to this aspect, an output corresponding to the condition input by the user can be presented to the user. Thus, it is possible to visualize the output corresponding to the input condition.

Also, in a system according to one aspect, the one or more external systems may include a camera, the input from the user received by the second input unit may include a condition regarding an inspection criterion, and the output unit may use an image of a target object captured by the camera, to output an inspection result of the target object based on the inspection criterion. According to this aspect, when inspecting the quality or the like of a target object using the learning module, it is possible to execute inspection in view of an input from the user.

A system according to one aspect is a system that controls operations of a robot based on information output from the output unit. The one or more external systems may include a sensor configured to detect a current orientation of the robot, the input from the user received by the second input unit may include a condition regarding a constraint on the operations of the robot, and the output unit may output information for controlling the operations of the robot in view of the current orientation of the robot and the condition. According to this aspect, when using a learning module to control the operations of a robot, it is possible to enable the robot to operate in view of an input from the user.

A system according to one aspect is a system for controlling operations of a robot based on information output from the output unit. The one or more external systems may include a sensor configured to detect at least one of a current position and a current orientation of the robot, the input from the user received by the second input unit may include a condition regarding safety of the robot in avoiding an obstacle, and the output unit may output information for controlling the operations of the robot in view of the current position of the robot and the condition. According to this aspect, when using a learning module to control the operations of a robot to enable the robot to avoid an obstacle, it is possible to enable the robot to perform an avoidance action in view of an input from the user.

In a task execution system according to one aspect, the one or more external systems may include a camera, the input from the user received by the second input unit may include a condition regarding a part of a human body, and the output unit may use an image of a person captured by the camera to determine a matching level with a specific target image based on the condition input by the user. According to this aspect, when using a learning module to search for a person captured by a surveillance camera or the like, it is possible to realize a search in view of an input from the user.

A training apparatus according to one aspect is an apparatus that trains the learning module included in the above-described systems, and includes a learning control unit configured to train the learning module based on training data that includes first training data that is acquired from one or more external systems, and second training data that includes data that is in the same format as a condition that is input by the user when execution of the predetermined task is to be realized. According to this aspect, it is possible to train a learning module that is used by a system that uses a learning module to realize execution of a predetermined task.

A control method according to one aspect is a method for realizing execution of a predetermined task, using a system that is provided with a learning module that includes a trained model that has been subjected to predetermined training through machine learning, or a model that is equivalent to the trained model in terms of an input-output relationship. The method includes: a first step in which a first input unit receives information that is acquired from one or more external systems, and generates at least a portion of information that is to be input to the learning module; a second step in which the learning module outputs predetermined information based on at least the information generated in the first step; a third step in which an output unit acquires at least the information output in the second step, and generates information that is to be output from the system, the information output from the system being information based on which execution of a predetermined task is to be realized; and a fourth step that is performed substantially in parallel with at least one of the first step, the second step, and the third step, and in which an input from a user is received so that information that is based on the input from the user is input to at least one of the first input unit, the learning module, and the output unit, and information that is output from the output unit varies based on the input from the user. According to this aspect, with a method that uses a learning module to cause a system to execute a predetermined task, it is possible to generate an appropriate output in view of an input from a user, without re-training the learning module.

A training method according to one aspect is a method for training the learning module included in the above-described systems, including: training the learning module through machine learning based on training data that includes first training data that is acquired from one or more external systems, and second training data that includes data that is in the same format as a condition that is input by the user when execution of the predetermined task is to be realized. According to this aspect, it is possible to provide a method for training a learning module that is used by a system that uses a learning module to realize execution of a predetermined task.

A program according to one aspect causes a computer that includes a learning module that is constituted by a trained model that has been subjected to predetermined training through machine learning to realize execution of a predetermined task, or a model that is equivalent to the trained model in terms of an input-output relationship, to execute: a first step of receiving information that is acquired from one or more external systems, and generating at least a portion of information that is to be input to the learning module; a second step in which the learning module outputs predetermined information based on at least the information generated in the first step; a third step of acquiring at least the information output in the second step, and generating information that is to be output from the computer, the information output from the computer being information based on which execution of a predetermined task is to be realized; and a fourth step that is performed substantially in parallel with at least one of the first step, the second step, and the third step, and in which an input from a user is input in at least one of the first step, the second step, and the third step so that information that realizes execution of the predetermined task varies based on the input from the user. According to this aspect, with a program that uses a learning module to cause a system to execute a predetermined task, it is possible to generate an appropriate output in view of an input from a user, without re-training the learning module.

A program according to one aspect causes the computer to realize a function of training the learning module through machine learning based on training data that includes first training data that is acquired from one or more external systems, and second training data that includes data that is in the same format as a condition that is input by the user when execution of the predetermined task is to be realized. According to this aspect, it is possible to provide a program for training a learning module that is used by a system that uses a learning module to realize execution of a predetermined task.

In the present specification and so on, "unit" does not simply means a physical means or part, and may refer to a case in which the functions of the means or part are realized by a hardware processor executing software that is stored in a storage apparatus. The functions of one "unit" may be realized by two or more physical means, and the functions of two or more "units" may be realized by one physical means.

According to one or more embodiments, it is possible to allow a user to make adjustments according to the conditions of work, during the execution of work, in cases where a system realizes execution of a predetermined task using a learning module that includes a trained model or a model that is equivalent to the trained model.

BRIEF DESCRIPTION OF THE DRAWINGS

FIG. 6 is a diagram illustrating an example of training data.

FIG. 8 is a diagram illustrating examples of operation candidates, gripping success rates, and constraint satisfaction levels.

FIG. 9 is a diagram illustrating examples of operation determination rules.

FIGS. 11A and 11B are diagrams illustrating examples of gripping success rates and constraint satisfaction levels.

FIG. 15 is a diagram illustrating examples of original target path candidates, avoidance success rates, and target deviation rates.

FIG. 19 is a diagram illustrating an example of a matching level and a weight, for each body part.

DETAILED DESCRIPTION

Hereinafter, one or more embodiments will be described in detail with reference to the drawings. Note that identical elements are denoted by identical reference signs, and redundant description thereof is omitted. Also, the following one or more embodiments are examples that illustrate the present invention, and is not intended to limit the present invention to only the one or more embodiments. Furthermore, the present invention may be variously modified without departing from the spirit thereof.

Figure 1:
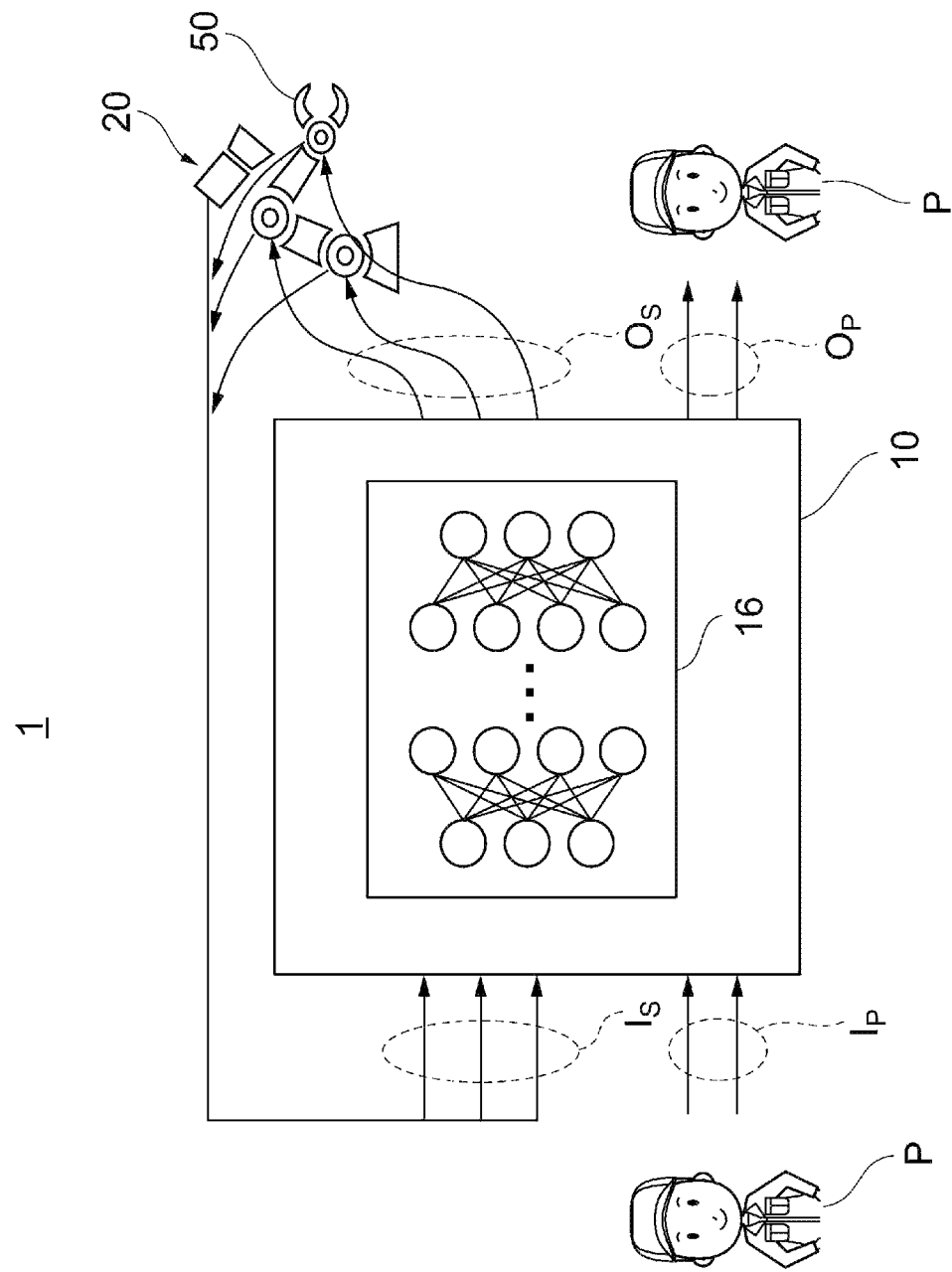
FIG. 1 is a diagram illustrating a concept of an overall system that includes a task execution system according to one or more embodiments.

FIG. 1 is a diagram showing a concept of an overall system 1 that includes a system 10 (hereinafter also referred to as "task execution system 10") that realizes execution of a predetermined task according to one or more embodiments. The task execution system 10 is a system that realizes execution of a predetermined task, using a learning module 16. Examples of tasks that are executed may include, but are not limited to, the task of determining the quality of a product and outputs the result of inspection on a display device, the task of outputting an operational instruction to a robot to instruct the robot to grip an object, and so on. Note that, as described below, the learning module 16 includes one unit of a dedicated or general-purpose piece of hardware or software that has the ability to learn through machine learning, or one unit composed of a given combination of such units. That is, the learning module 16 includes a software program that includes at least one of: a learning model that has the ability to learn through machine learning; and a trained model that has acquired a predetermined ability through machine learning.

The learning module 16 includes a computation apparatus that includes: a storage apparatus in which the software program is stored; and a hardware processor that reads out and executes the software program. "Realizing execution of a predetermined task" refers to a case where an external system 50 is caused to execute a predetermined task, and may also refer to a case where the task execution system 10 itself executes a predetermined task. The task execution system 10 is applicable not only to a case where an actual system is caused to execute a task, but also to a case where a simulator, which is a virtual system, is caused to execute a task. In such a case, targets that are to be controlled are a virtual sensor, a virtual robot, a virtual system, and so on.

As shown in FIG. 1, the task execution system 10 can receive information $I_P$ that is input from a user (person) P, in addition to information $I_S$ that is input from an external system 20 on the input side (hereinafter also referred to as "input-side external system 20") that includes a sensor and an external device, for example.

Examples of information $I_S$ that is input from the input-side external system 20 include, but are not limited to, an image such as a bitmap image, a group of points (a point cloud), a force (an output value from a force sensor), a distance (an output value from a proximity sensor), and a robot orientation (an output value from an encoder). Examples of information $I_P$ that is input from a user include, but are not limited to, requirements of work and constraint conditions concerning work. Requirements of work include, for example, a selection of conditions that are in a trade-off relationship, such as a degree of balance between accuracy and speed, and constraint conditions concerning work include, for example, prohibition settings, such as specification of an untouchable part of a target object. Hereinafter, information $I_P$, such as requirements and constraint conditions concerning a relevant task, may simply be referred to as "condition (constraint)". The behavior of the task execution system 10 according to one or more embodiments is changed according to a condition input from a user. That is, a condition input by a user is information that changes the behavior of the task execution system 10 (e.g. a determination result and an operational instruction that are to be output) when the task execution system 10 executes a predetermined task. When input to a first input unit 12 described below, a condition input by a user is used as a condition that changes information that is to be input to the learning module 16 via the first input unit 12. When input to the learning module 16 described below, such a condition is used as a condition that changes internal parameters of a trained model included in the learning module 16. When input to an output unit 18 described below, such a condition is used as a condition that changes information that is to be output from the output unit 18. Here, to change information may be to delete information.

Based on information $I_S$ and information $I_P$ thus received, the task execution system 10 executes a predetermined task, using the learning module 16, or outputs information $O_S$ that is used to cause the external system 50 on the output side (hereinafter also referred to as "output-side external system 50") to execute a predetermined task. Information $O_S$ output from the task execution system 10 is passed to the output-side external system 50 so that a predetermined task is executed. Information that is output from the task execution system 10 may contain information $O_P$ that is to be Presented to a User P. Examples of Information $O_S$ that is output to the output-side external system 50 include, but are not limited to, an instruction value for a motor, an operational instruction for a robot hand, an optimum gripping orientation, and an image inspection result. Information $O_P$ that is presented to a user P is information that is visualized according to a condition included in information IP input by the user P. Specifically, examples of information OP include, but are not limited to, a task achievement rate and an intermediate result. Also, a user who inputs information $I_P$ and a user to whom information $O_P$ is presented may be the same or different. Here, it is preferable that information $O_P$ is information corresponding to a condition that is input by a user. For example, data corresponding to a condition input by a user and indicating the degree of fulfillment of the condition may be used. Also, for example, if information $I_P$ input from a user is a degree of balance between accuracy and speed regarding robot operation control, instruction information (an instruction value) regarding robot operation control, an expected accuracy (a possible operational error range) of the robot operating based on the instruction information (the instruction value), and the time required to fulfill the operation may be presented as information $O_P$.

In one or more embodiments, when the task execution system 10 is to realize execution of a predetermined task, using the trained learning module 16, based on the information $I_S$ input from the input-side external system 20, the user P can specify information $I_P$, such as requirements and constraint conditions concerning the task. The task execution system 10 determines output in view of the information $I_P$ specified by the user P, in addition to the information $I_S$ input from the input-side external system 20. According to one or more embodiments, when requirements and constraint conditions such as the accuracy, execution speed, and failure tolerance of a task that is to be executed need to be changed for each work site and each kind of work, the user P can obtain a desirable output corresponding to conditions such as requirements and constraint conditions, by changing information $I_P$ input by the user P, without re-training the learning module 16.

Also, if an unexpected operation occurs when the task execution system 10 realizes execution of a predetermined task, the user P can adjust the behavior of the task execution system 10 executing the task, by adjusting the information $I_P$ to be input (such as input parameters). In addition, when a problem occurs, there are cases in which it is easy to identify the cause by using the information $O_P$ presented to the user P.

Note that the user P does not need to input information $I_P$ every time information $I_S$ is input from the input-side external system 20. Instead of information $I_S$ input by the user P, a predetermined value corresponding to a task that is to be executed, or an object that is the target of the task may be applied. If this is the case, for example, when a condition has changed or a condition is to be applied to a unique work site, the user P may input a condition to the task execution system 10 according to the circumstances. In this case, the predetermined value may have been determined based on training data that is used to train a learner 70 as described below. That is, training data includes data that is in the same format as a condition that can be input by the user P when execution of a task is to be realized using the learning module 16. Therefore, it is possible to set a value based on data that is in the same format as a condition that is input by the user P when a task is to be executed.

Figure 2:
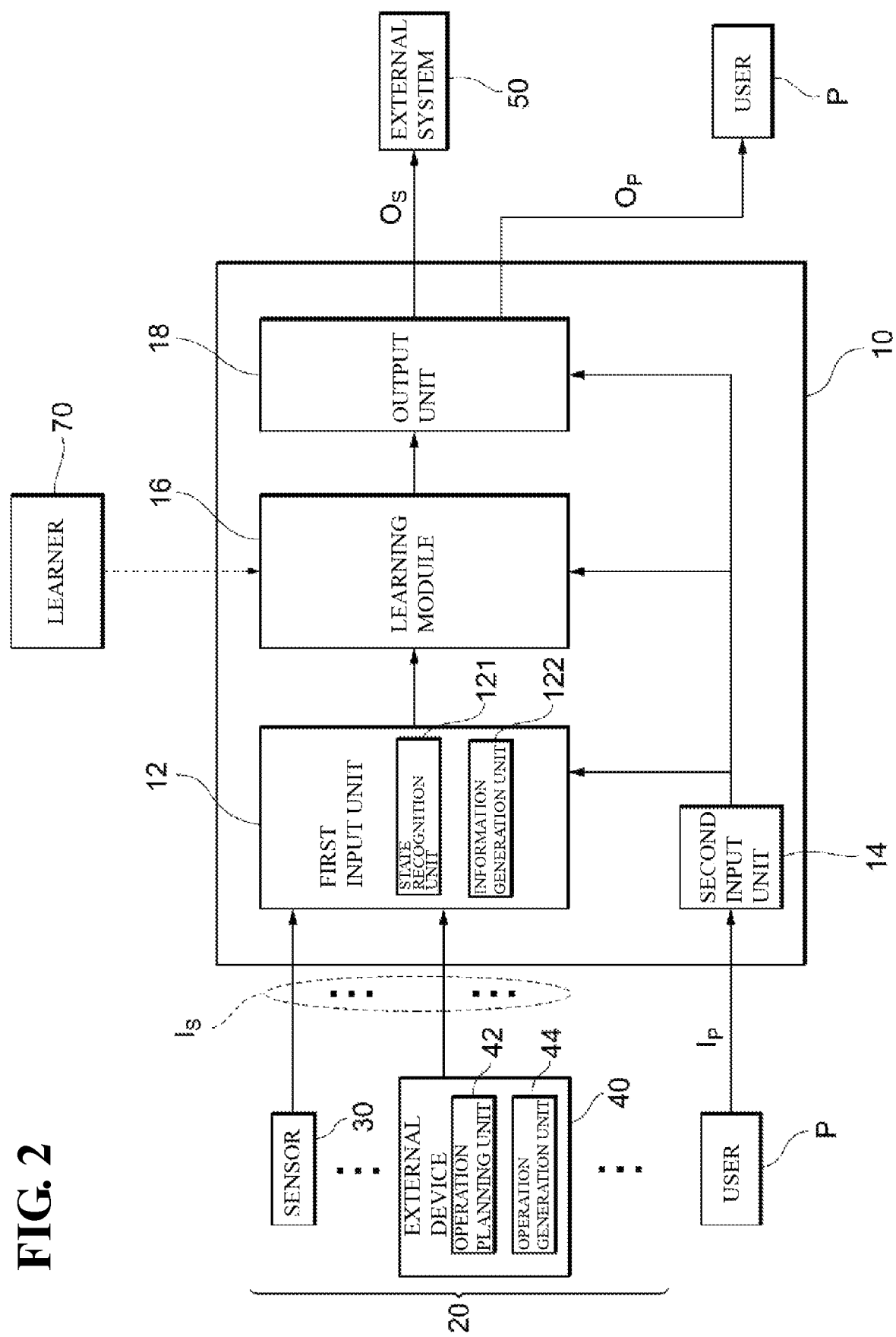
FIG. 2 is a block diagram illustrating an example of a functional configuration a task execution system according to one or more embodiments.
Figure 3:
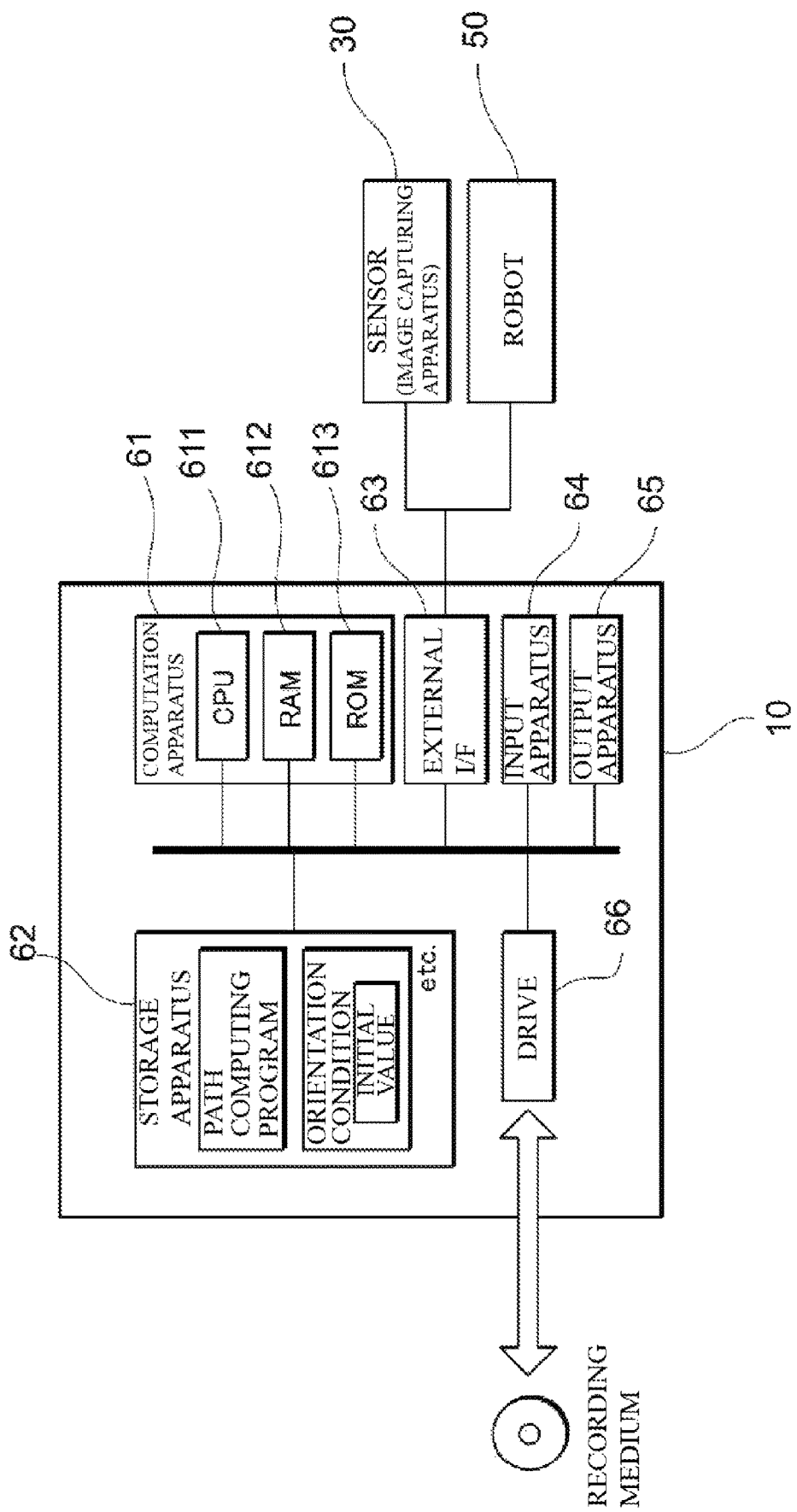
FIG. 3 is a diagram illustrating an example of a hardware configuration of a task execution system according to one or more embodiments.

FIG. 2 is a block diagram showing an example of a functional configuration of the task execution system 10 according to one or more embodiments. FIG. 3 is a block diagram showing an example of a hardware configuration of the task execution system 10 according to one or more embodiments.

As shown in FIG. 2, the task execution system 10 includes the first input unit 12, a second input unit 14, the learning module 16, and the output unit 18. Also, as shown in FIG. 3, the task execution system 10 includes a computation apparatus 61, a storage apparatus 62, an external interface (external I/F) 63, an input apparatus 64, and an output apparatus 65 to realize the functions shown in FIG. 2.

The computation apparatus 61 includes a CPU (Central Processing Unit) 611, which is a hardware processor, a RAM (Random Access Memory) 612, a ROM (Read Only Memory) 613, and so on, and controls each constituent element according to information processing that is to be performed. The storage apparatus 62 is an auxiliary storage apparatus such as a hard disk drive or a solid state drive, and stores, for example, parameters of a trained model that is included in the learning module shown in FIG. 2, and programs or the like that are used to execute predetermined processing that is performed using the trained model. The storage apparatus 62 stores information $I_S$ that is input from the input-side external system 20 (e.g. a sensor 30) and information $I_P$ that is input by a user. The storage apparatus 62 also stores programs that are used to realize execution of tasks. For example, in a case where the task execution system 10 controls a gripping system that uses a robot hand, the storage apparatus 62 stores a program for computing the path of the robot hand, the initial value of a constraint input from the user regarding the orientation of the robot hand, and so on.

The external interface 63 is an interface that is used for connection to the input-side external system 20 and the output-side external system 50, and is configured as appropriate depending on the input-side external system 20 and the output-side external system 50 that are connected. The external interface 63 may be a communication interface that is used for connection to another computer via a network. The first input unit 12, the second input unit 14, and the output unit 18 shown in FIG. 2 include an external interface 63 that is hardware. In one or more embodiments, the task execution system 10 is connected to the input-side external system 20 and the output-side external system 50 via the external interface 63. The task execution system 10 reads out a program for executing computation processing based on a trained model, loads the program onto the RAM 612, and interprets and executes the program using the hardware processor.

Note that the task execution system 10 may further be provided with, for example, the input apparatus 64 for performing input such as a mouse or a keyboard, and the output apparatus 65 for performing output, such as a display or a speaker.

The task execution system 10 may further be provided with a drive apparatus 66 for reading a program stored in a recording medium, such as a CD drive or a DVD drive.

In FIG. 2 again, the first input unit 12 and the second input unit 14 function as interfaces for inputting information to the task execution system 10. The first input unit 12 has the function of receiving information $I_S$ that is input from the external system 20, not from a person, such as a sensor 30 and an external device 40. On the other hand, the second input unit 14 has the function of receiving information that is input from a person, i.e. information $I_P$ that is input from a user of the task execution system 10.

The second input unit 14 passes the information $I_P$ received from the user to at least one of: the first input unit 12; the learning module 16; and the output unit 18. At this time, the second input unit 14 may pass all or part of the information received from the user to any unit, without change, or pass information that has been generated or converted based on the information received from the user.

The second input unit 14 may also be provided with a memory that stores the information $I_P$ received from the user. With this configuration, the information stored in the memory is passed to any unit, and thus the user P is saved from having to input information every time. In this regard, it is preferable that the memory stores, in addition to information $I_P$, a correspondence relationship with information $I_S$ that is input to the first input unit 12. With this configuration, it is possible to select an appropriate piece of information $I_P$ according to the contents of pieces of information $I_S$ that are acquired from the input-side external system 20. Note that the memory may be located inside the second input unit 14. That is, it is sufficient that the task execution system 10 is provided with a memory.

The first input unit 12 generates information that is to be input to the learning module 16, based on the information received from the input-side external system 20. Upon information being passed from the second input unit 14 to the first input unit 12, i.e. upon the first input unit 12 receiving information that is based on an input from a user, the first input unit 12 generates information that is to be input to the learning module 16 in view of information that is based on the input from the user as well. At this time, the first input unit 12 may pass all or part of the information received from the input-side external system 20 and the second input unit 14 to the learning module 16, without change, or pass information that is generated or converted based on the information received from the input-side external system 20 and the second input unit 14.

The first input unit 12 may be provided with a state recognition unit 121 and an information generation unit 122. The state recognition unit 121 and the information generation unit 122 are realized by the computation apparatus 61 of the task execution system 10 executing information processing that is based on a state recognition program that is stored in the storage apparatus 62.

The state recognition unit 121 recognizes, for example: the position and/or orientation state of a target object that is observed by a sensor 30; and the internal state of an external device 40, based on observation information acquired from the sensor 30 and the external device 40, and outputs the recognized states to the learning module 16 as recognition results.

The information generation unit 122 generates new information or performs data format conversion, based on information acquired from a sensor 30, an external device 40, and the second input unit 14. In the present specification, generation and conversion of information may simply be referred to as "generation of information".

The state recognition unit 121 and the information generation unit 122 may have a trained model. That is, state recognition that is based on information acquired from the input-side external system 20 and conversion of the information acquired from the input-side external system 20 may be performed using trained models that have been generated based on predetermined machine learning. At this time, the state recognition unit 121 and the information generation unit 122 function as sub learning modules for achieving a predetermined task that is to be executed by the learning module 16.

The learning module 16 includes one unit of dedicated or multi-purpose hardware or software that has the ability to learn through machine learning, or one unit constituted by a given combination of such units. The learning module 16 also includes a trained model, and a copy or a distilled version of the trained model. Here, a copy of a trained model is not limited to a model in which the internal structure of the trained model is copied, but may be a model generated by performing additionally training on a trained learning module that has been trained or on a copy of the trained learning module. A distilled model is a trained model that is obtained through so-called distillation. Note that distillation includes training another learning model that has a structure that is different from the structure of the trained model such that the functions of the trained model are retained, to obtain another trained model that has been trained. Here, it is preferable that the other trained model (the distilled model) has a simpler internal structure and is more suitable for deployment than the trained model on which the distillated model is based. Note that a copy and a distilled version of the trained model are not necessarily provided with the ability to learn. The learning module 16 includes a predetermined structure that has the function of converting input to output according to parameters. One example of such a structure is a neural network. Therefore, in the following description, it is assumed that the learning module 16 is constituted by a neural network. However, the learning module 16 is not limited to a neural network.

In one or more embodiments, information may be input to the learning module 16 from the first input unit 12 and the second input unit 14. Thus, in the learning module 16, a predetermined computation is performed based on information acquired from the input-side external system 20 including a sensor 30 and an external device 40, for example, and information acquired from a user (a person), and the result of computation is output in the form of a value or a pattern. The information thus output is passed to the output unit 18.

If the learning module is constituted by a multilayer neural network, information input from the first input unit 12, i.e. information acquired from the input-side external system 20, is input to the input layer of the neural network. In contrast, although information input from the second input unit 14, i.e. information acquired from the user, may also be input to the input layer of the neural network, this is not essential, and may be input to a layer other than the input layer, such as an intermediate layer or the output layer.

A trained model that has been trained through machine learning so as to be able to execute a predetermined task, or to cause the external system 50 to execute a predetermined task, may be employed as the learning module 16. This trained model can be acquired by the learner 70 through machine learning using training data that includes information acquired from the input-side external system 20 including a sensor 30 and an external device 40, for example, and information acquired from a user (a person). Alternatively, a model that is equivalent to the trained model in terms of an input-output relationship, such as a copy or a distilled version of the trained model, may be employed as the learning module 16. In the present specification, these models may simply be referred to as trained models. Furthermore, the learning module 16 may have a plurality of trained models.

The output unit 18 is an interface for outputting information from the task execution system 10. The output unit 18 generates information $O_S$ and information $O_P$, which are to be output from the task execution system 10, based information acquired from the learning module 16. Note that the output unit 18 may generate either information $O_S$ or information $O_P$. If information has been passed from the second input unit 14 to the output unit 18, i.e. if the output unit 18 has acquired information that is based on input from a user, information $O_S$ and information $O_P$, which are to be output from the task execution system 10, are generated in view of the information that is based on the input from the user as well. At this time, the output unit 18 may output all or part of the information received from the learning module 16 and the second input unit 14, without change, or output information that has been generated or converted based on the information received from the learning module 16 and the second input unit 14.

The information output from the output unit 18, i.e. the information $O_S$ output from the task execution system 10, is input to the output-side external system 50, and a predetermined task is executed in the output-side external system 50. Also, information $O_P$, which is part of the information output from the output unit 18, may be information that is presented to the user P. Here, if the learning module 16 is constituted by a multilayer neural network, one layer from among the intermediate and output layers of the neural network preferably has a node that outputs information that is to be presented to the user P.

The learner 70 is a training apparatus that has the function of acquiring a trained model that is to be used as the learning module 16. Although the learner 70 can generate the learning module 16 included in the task execution system 10, the learner 70 is not directly included in the task execution system 10. Machine learning for realizing execution of a predetermined task is performed in the learner 70, using training data that includes information input from the input-side external system 20 and information input from a user. Training data that is used in machine learning includes an input variable, which is data corresponding to a constraint that is input by a user, and an output value, which indicates desirability of the output corresponding to the value of the input variable. For example, it is possible to adopt the technology of training a learning module by directly providing the learning module with training data that includes correct data that indicates a desirable output value corresponding to the input variable. Alternatively, it is possible to adopt the technology of training a learning module by providing the learning module with an evaluation function that indicates desirability of the output. For example, a function that can determine an evaluation value corresponding to a combination of an input and an output may be used as the evaluation function. The learning module 16 can be generated based on the trained model or the parameters thereof (such as connection weights in the case of a neural network), acquired by the learner 70.

Also, as shown in FIG. 2, the task execution system 10 is connected to the input-side external system 20 that includes, for example, one or more sensors 30 and one or more external devices 40, via a communication network. Note that each sensor 30 and each external device 40 may individually be regarded as one input-side external system 20, and alternatively, a combination of a given sensor 30 and a given external device 40 may be regarded as one input-side external system 20. An example in the latter case is a robot. Furthermore, the task execution system 10 is connected to the output-side external system 50 via a communication network. Information is input to the task execution system 10 from the input-side external system 20 and a user, the task execution system 10 outputs information to the output-side external system 50, and thus a predetermined task is executed. Note that the task execution system 10 may be regarded as a sub system for executing a predetermined task, and the sub system and the output-side external system 50 that uses information output from the sub system may be configured as one integrated system.

Examples of a sensor 30 include, but are not limited to, a physical quantity sensor for detecting a physical quantity, a chemical quantity sensor for detecting a chemical quantity, and an information sensor for detecting information. Examples of a sensor 30 may include any sensor. Examples of a physical quantity sensor include a camera that detects light and outputs image data or video data, a heartbeat sensor that detects the heartbeat of a person and outputs heartbeat data, a blood pressure sensor that detects the blood pressure of a person and outputs blood pressure data, a vital sensor such as a body temperature sensor that detects the body temperature of a person and outputs body temperature data, and any other sensors that detect a physical quantity and output an electrical signal. Examples of a chemical sensor include a gas sensor, a humidity sensor, an ion sensor, and any other sensors that detect a chemical quantity and output an electrical signal. Examples of an information sensor include a sensor that detects a specific pattern from statistical data and any other sensors that detect information.

Each external device 40 is constituted by a computer system, a robot, or any other various devices. Note that an external device 40 and a sensor 30 may be integrated into one piece. For example, an industrial robot, which is an external device 40, has a plurality of motors (shafts) and a plurality of links (structures) that are driven by the motors (shafts). The motors and the links that are driven by the motors are connected one after the other, and thus a multi-jointed industrial robot is formed. Here, each motor may be integrated with an encoder, which is a sensor 30 that detects the rotation angle of the motor. An external device 40 may include an operation planning unit 42 and an operation generation unit 44. The operation planning unit 42 plans the operation of a target object that is, for example, controlled by the external device 40, or the operations of the external device 40 itself, and has the function of creating an operation path, which serves as an original target path. The operation generation unit 44 has the function of generating operation candidates, and generating avoidance action candidates to avoid colliding with an obstacle. Here, operation candidates and avoidance action candidates are expressed as predetermined numerical values and/or numerical vectors that indicate directions in which the external device 40 moves. Note that the operation planning unit 42 and the operation generation unit 44 may have a trained model. That is, operation candidates and avoidance action candidates may be generated using a trained model that has been generated through predetermined machine learning. Also, the operation planning unit 42 and the operation generation unit 44 may be provided in the task execution system 10. That is, the operation planning unit 42 and the operation generation unit 44 are provided in the task execution system 10, generate operation candidates and avoidance action candidates based on information $I_P$ that is acquired from a sensor 30 and/or an external device 40, and input the generated candidates to the learning module 16. At this time, the operation planning unit 42 and the operation generation unit 44 function as sub learning modules for achieving a predetermined task that is to be executed by the learning module 16.

Although FIG. 2 shows the input-side external system 20 and the output-side external system 50 as separate components, the input-side external system 20 and the output-side external system 50 may be configured as one integrated component. For example, when a robot with a robot hand is controlled using the task execution system 10, the robot hand can be both the input-side external system 20 and the output-side external system 50. For example, in a case of a robot equipped with a camera, the camera and an encoder that is provided in a joint of the robot may be equivalent to sensors 30. Also, if a value of an encoder is output via a robot, the robot may be equivalent to an external device 40. Furthermore, if a robot operates according to an operational instruction output from the task execution system 10, the robot may be equivalent to the output-side external system 50. In one or more embodiments, sensor data output from a sensor 30 may be directly input to the task execution system 10 from the sensor 30 itself, or indirectly input to the task execution system 10 from the sensor 30 via an external device 40. Therefore, in the present specification, a sensor 30 and an external device 40 are collectively referred to as "the input-side external system 20" without being distinguished from each other in some cases.

Note that the configuration of the task execution system 10 is not limited to that shown in the figure. For example, any blocks from among the aforementioned blocks may be physically or logically integrated into one piece, and each block may be physically or logically divided into two or more elements.

Figure 4:
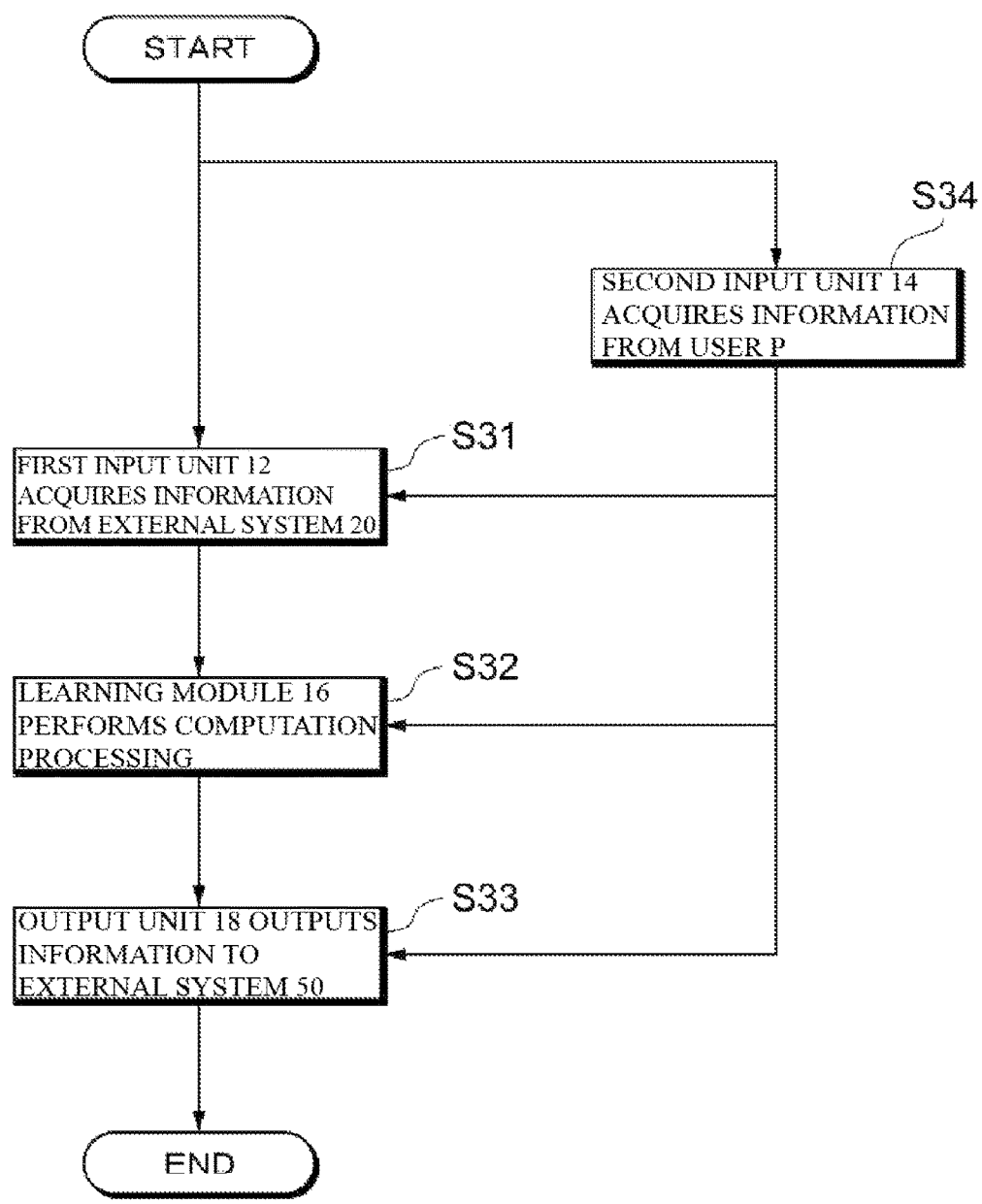
FIG. 4 is a diagram illustrating an example of a flow of processing that is performed by a task execution system according to one or more embodiments.

FIG. 4 is a diagram showing an example of a flow of processing that is performed by the task execution system 10 according to one or more embodiments. First, the first input unit 12 acquires information from the input-side external system 20 including a sensor 30 and an external device 40 (step S31). The first input unit 12 acquires information from the second input unit 14 in some cases. If necessary, the first input unit 12 converts the acquired information into data that is in a format suitable for processing that is performed by the learning module, for example, and thereafter outputs the data to the learning module 16.

The learning module 16 performs computation processing using a trained model, based on the information input from the first input unit 12 (step S32). In some cases, information from the second input unit 14 is also input to the learning module 16. In such cases, computation processing is performed based on the information input from the first input unit 12 and the information input from the second input unit 14, and the computation results are passed to the output unit 18.

The output unit 18 generates information that is used to cause the output-side external system 50 to perform a predetermined task, based on the information input from the learning module 16, and outputs the generated information to the output-side external system 50 (S33). In some cases, information from the second input unit 14 is also input to the output unit 18. In such cases, the output unit 18 generates information that is used to cause the output-side external system 50 to perform a predetermined task, based on the information input from the learning module 16 and the information input from the second input unit 14. For example, if the output-side external system 50 is a robot apparatus, and the predetermined task is a predetermined operation that is to be executed by the robot, the output unit 18 can acquire a plurality of operation candidates from the learning module 16, select a predetermined operation candidate from among the plurality of operation candidates based on the information input from the second input unit 14, and output information to the output-side external system 50.

In parallel with the processing in steps S31 to S33, the second input unit 14 acquires conditions that are required for the predetermined task to be executed and that have been specified by the user P, such as the requirements and constraint conditions of the task (step S34). The second input unit 14 passes the acquired information to at least one of: the first input unit 12; the learning module 16; and the output unit 18. It is preferable that to which one from among the first input unit 12, the learning module 16, and the output unit 18 the information is to be passed is set according to, for example, what task is to be executed by the output-side external system 50. However, this is not essential.

The following describes embodiments in which the task execution system 10 is applied to an image inspection apparatus, a gripping system, an obstacle avoidance system, a person search system, and an inverse kinematics model, respectively.

Embodiment 1: Image Inspection Apparatus

Figure 5:
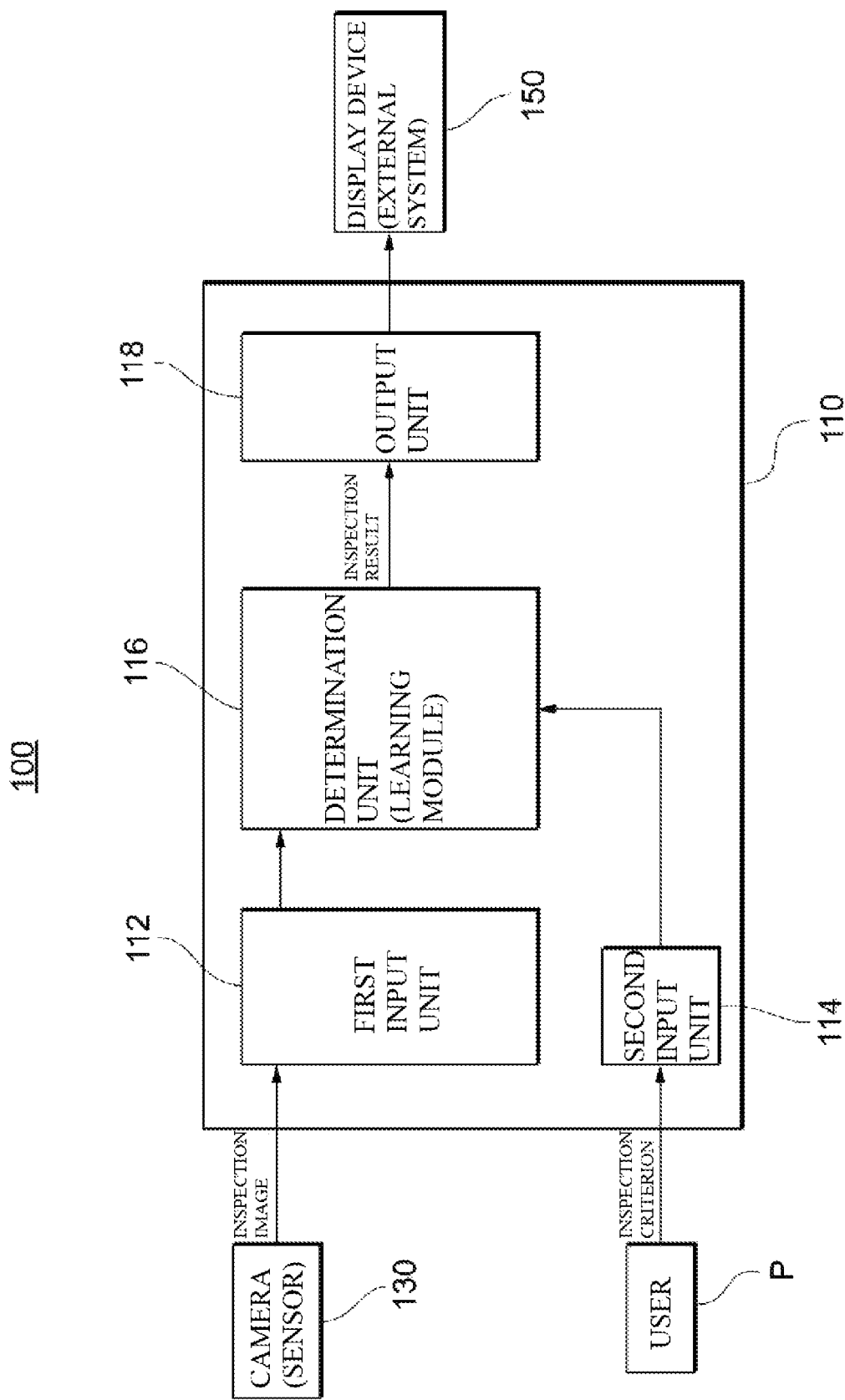
FIG. 5 is a block diagram illustrating an example of a functional configuration in a case where a task execution system is applied to an image inspection apparatus.

FIG. 5 is a block diagram showing an example of a functional configuration in a case where the task execution system 10 is applied to an image inspection apparatus. An image inspection apparatus 100 in one or more embodiments is an apparatus that performs, as a predetermined task, the task of determining the quality of a target object such as a product, using an image captured by a camera. Here, a system that includes a task execution system 110, a camera 130, and a display device 150 is referred to as "the image inspection apparatus 100". The task execution system 110 includes a first input unit 112, a second input unit 114, a determination unit 116, and an output unit 118. Note that the task execution system 110, the first input unit 112, the second input unit 114, the determination unit 116, the output unit 118, the camera 130, and the display device 150 are components that are respectively equivalent to the task execution system 10, the first input unit 12, the second input unit 14, the learning module 16, the output unit 18, the sensor 30, and the output-side external system 50 shown in FIG. 2. That is, the last two digits of the reference numeral of each component in the image inspection apparatus 100 are the same as those of the reference numeral of the component corresponding thereto in FIG. 2. The same applies to the other embodiments.

In one or more embodiments, in the image inspection apparatus 100, an image of an inspection target object captured by the camera 130 is input to the determination unit 116 via the first input unit 112. In addition, an inspection criterion, which is a condition input by the user P, is input to the determination unit 116 via the second input unit 114.

The determination unit 116 is constituted by a trained model (e.g. a trained neural network). Upon the determination unit 116 receiving an input image showing the external appearance of a product and inspection criteria, the determination unit 116 outputs an inspection result of the product in view of the inspection criteria specified by the user. For example, the inspection result is "good" or "bad". The inspection result output by the determination unit 116 is displayed on the display device 150 via the output unit 118. In addition to the inspection result, the image inspection apparatus 100 may also display information regarding the inspection criteria specified by the user P, on the display device 150. For example, a criterion regarding an inspection target object, a criterion regarding the environment in which the inspection is to be performed, and a criterion regarding inspection determination may be input as inspection criteria. As a criterion regarding an inspection target object, at least one of: the material, size, color, reflectance, transparency, and so on of the target object can be input, for example. As a criterion regarding the environment in which the inspection is to be performed, the degree of brightness in the environment can be input, for example. As a criterion regarding inspection determination, a criterion regarding the severity of determination of "good" or "bad" that is to be output can be input. Inspection criteria are not limited to these examples, and a plurality of inspection criteria may be used in combination.

FIG. 6 is a diagram showing an example of training data that is provided when a trained model that constitutes the determination unit 116 is to be acquired through machine learning. As shown in the figure, in training data, each image is associated with pieces of correct data respectively corresponding to the determination criteria. In the example shown in FIG. 6, input images (image 1, image 2, etc.) are images of an inspection target object. In this example, there are three levels of determination criteria. Image 1 is an image that is to be determined as being "good" in terms of the inspection results regarding all of the criteria 1 to 3. Image 2 is an image that is to be determined as being "good" in terms of the inspection results regarding the criteria 1 and 2, and as being "bad" regarding the criterion 3. Image 3 is an image that is to be determined as being "good" in terms of the inspection result regarding the criterion 1, and as being "bad" regarding the criteria 2 and 3. Images 4 and 5 are images that are to be determined as being "bad" in terms of the inspection results regarding all of the criteria 1 to 3.

It is possible to acquire a trained model, which is to be used in the image inspection apparatus 100, by performing supervised learning through which the learner is supplied with a plurality of pieces of training data in each of which an image is associated with pieces of correct data respectively corresponding to the determination criteria, as shown in FIG. 6.

Upon a user selecting one determination criterion from among the criteria 1 to 3, the trained model acquired as a result of learning using the training data shown in FIG. 6 can output the inspection result corresponding to the selected determination criterion. In the example shown in FIG. 6, the criteria 1 to 3 are respectively a lax criterion, a standard criterion, and a strict criterion.

In one or more embodiments, three levels of criteria can be input by the user P. However, as a matter of course, two levels, or four or more levels of criteria may be provided. Also, it is possible to enable the user P to specify a criterion using continuous values in a range such as the range of −1 to 1, instead of using discrete numerical values such as criteria 1, 2, 3, etc. Furthermore, it is also possible to enable the user P to select a criterion from among labels (lax, standard, strict, etc.) prepared in advance.

In this way, it is possible to realize an image inspection apparatus that allows the user P to flexibly select inspection criteria according to the details of the inspection when executing an inspection, by performing machine learning using training data that includes inspection criteria in a desirable format, to acquire a trained model with which determination results vary depending on the inspection criteria, and using the learning module 16 that has the trained model thus acquired, and any inspection criteria that are input by the user P to the learning module 16.

Embodiment 2-1: Gripping System (1)

Figure 7:
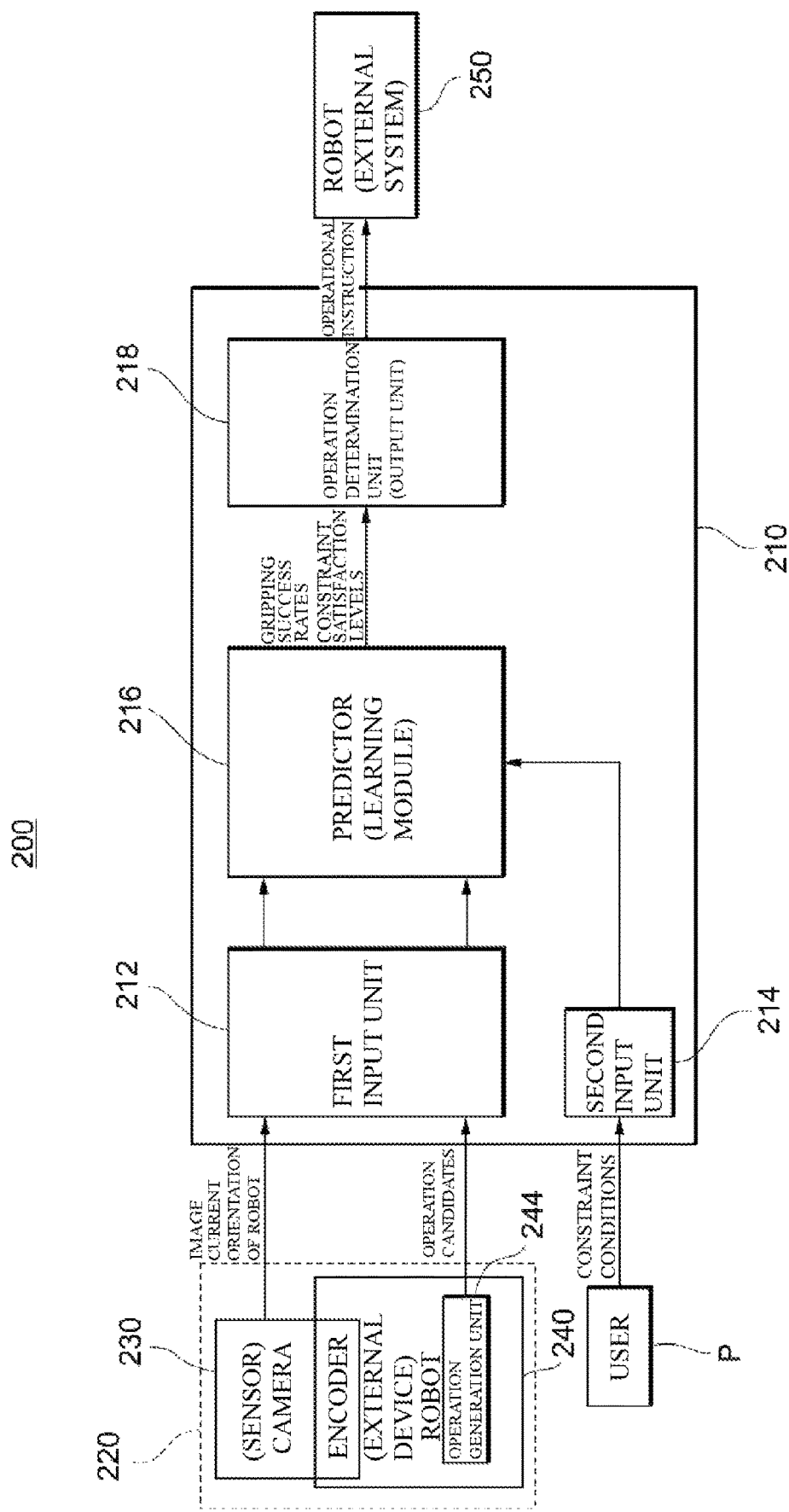
FIG. 7 is a block diagram illustrating an example of a functional configuration in a case where a task execution system is applied to a gripping system.

FIG. 7 is a block diagram showing an example of a functional configuration in a case where the task execution system 10 is applied to a gripping system. A gripping system 200 in one or more embodiments is a system for causing a robot to grip an object, and includes a task execution system 210, sensors 230 such as a camera and an encoder, and a robot 240 or 250. In FIG. 7, although different reference numerals 240 and 250 are assigned to the robot, they actually refer to the same robot. Also, at least one or all of the sensors 230 may be provided in the robot 240.

The task execution system 210 includes a first input unit 212, a second input unit 214, a predictor 216, and an operation determination unit 218. These components respectively correspond to the first input unit 12, the second input unit 14, the learning module 16, and the output unit 18 in FIG. 2.

In one or more embodiments, the gripping system 200 is configured such that an image that shows the robot's hand and a grip-target object, which has been captured by the camera 230, and the current orientation of the robot 240, which can be acquired from the output value of the encoder 230 mounted on a joint of the robot, are input to the predictor 216 via the first input unit 212. The task execution system 210 is also configured such that a plurality of operation candidates that have been created by an operation generation unit 244 of the robot 240 are acquired, and the plurality of operation candidates thus acquired are input to the predictor 216 via the first input unit 212. In addition, a condition input by the user P is input to the predictor 216 via the second input unit 214. Note that the operation generation unit 244 may be provided in the task execution system 210, or provided separately from the robot 230 and the task execution system 210. In addition, the operation generation unit 244 may have a trained model. That is, operation candidates may be generated using a trained model that has been generated through predetermined machine learning. At this time, the operation generation unit 244 functions as a sub learning module for achieving a predetermined task that is to be executed by the learning module 16.

As conditions that are input by the user P, constraint conditions such as "an area that is desired to be gripped" (a grip recommendation area) and "an area that is not to be gripped" (a grip prohibition area) of a grip-target object may be specified as constraints on work, for example.

The predictor 216 predicts, based on: the current position and/or orientation of the robot, which are/is calculated using movement direction vectors that indicate a plurality of operation candidates acquired from the robot 240, an image input from the camera 230 serving as a sensor, and values input from the encoder 230 serving as a sensor; and constraint conditions input by the user P, gripping success rates of the robot's hand when the hand moves according to the respective movement direction vectors, and constraint satisfaction levels corresponding to the constraint conditions input by the user P. The operation determination unit 218 calculates an evaluation value for each operation candidate, based on the gripping success rates and the constraint satisfaction levels that have been output from the predictor 216, and determines the next operation from among the operation candidates, based on the evaluation values. Then, the operation determination unit 218 generates an operational instruction for realizing the execution of the determined operation, and outputs the operational instruction to the robot 250. In addition, although not shown in the figure, information that is based on the gripping success rates and the constraint satisfaction levels predicted by the predictor 216 may be output to a display or the like and presented to the user P.

FIG. 8 is a diagram showing examples of a plurality of operation candidates (movement direction vectors), which are input to the predictor 216, and the respective gripping success rates and constraint satisfaction levels of the operation candidates, which are output from the predictor 216, in one or more embodiments. In the figure, the movement direction vectors such as (0,0,0), (0,1,0), and (0,−1,0) indicate candidates of the next operation. In a movement direction vector (x,y,z), x indicates the amount of movement of the hand in the left-right direction, y indicates the amount of movement of the hand in the top-bottom direction, and z indicates the amount of rotation of the hand. For example, (0,0,0) indicates that the hand is not to be moved at the next operation, and (0,1,0) indicates that the hand is to be moved upward by one unit amount.

Each gripping success rate indicates the probability of ultimate success in gripping in a case where the operation corresponding thereto is performed next. Each constraint satisfaction level indicates whether or not the constraint conditions specified by the user will be satisfied if the operation corresponding thereto is performed next. When the constraint satisfaction level is "1", the constraint conditions will be satisfied, but when the constraint satisfaction level is "0", the constraint conditions will not be satisfied. For example, in a case where the user specifies a grip prohibition area, if an operation candidate results in the hand touching the grip prohibition area of the target object, the constraint satisfaction level of the operation candidate is determined to be "0".

The example in FIG. 8 shows that the predictor 216 has output gripping success rate "0.4" and constraint satisfaction level "1" for the operation candidate (0,0,0), and gripping success rate "0.7" and constraint satisfaction level "0" for the operation candidate (0,1,0). That is, if the hand is not moved, the gripping success rate is only 0.4, but the hand will not enter the prohibition area. On the other hand, if the hand is moved upward by one unit amount, the gripping success rate increases to 0.7, but the constraint satisfaction level is 0 because the prohibition area will be gripped if gripping is successful.

Note that the trained model that constitutes the predictor 216 has been trained through machine learning so that, upon receiving: an image that shows the hand and the work target; the current orientation of the robot that can be acquired from the value of the encoder at the joint of the robot; and a movement direction vector, the predictor 216 outputs the gripping success rate and the constraint satisfaction level when the hand will be moved according to the movement direction vector. Such a trained model can be acquired through machine learning using training data in which, for example: an image that shows the hand and the work target; the current orientation of the robot that can be acquired from the value of the encoder at the joint of the robot; a movement direction vector that indicates an operation candidate; and the gripping success rate and the constraint satisfaction level when the hand will be moved according to the movement direction vector, are associated with each other.

The operation determination unit 218 calculates evaluation values based on the respective gripping success rates and constraint satisfaction levels of the operation candidates, output from the predictor 216. In FIG. 8, an evaluation value is a gripping success rate multiplied by a constraint satisfaction level. However, the technology of calculating an evaluation value is not limited in this way. The operation determination unit 218 determines the next operation to be performed, based on the respective evaluation values of the operation candidates, according to predetermined operation determination rules.

FIG. 9 shows examples of operation determination rules according to one or more embodiments. If the operation determination rules in FIG. 9 are applied to the operation candidates in FIG. 8, condition 1 is not satisfied because the evaluation value is 0.4<0.9 when the hand is not moved (0,0,0), and condition 2 is also not satisfied because the evaluation value of the operation candidate (0,0,0.5) is 0.6>0.5. Thus, condition 3 is satisfied, and an operation "move in a direction that maximizes the success rate" is selected. Therefore, the movement direction vector (0,0,0.5) is selected as the next operation. In this way, the operation determination unit 218 outputs an operational instruction for rotating the hand by 90°, to the robot 250.

The description above illustrates an embodiment in which the predictor 216 outputs gripping success rates and constraint satisfaction levels, the operation determination unit 218 calculates evaluation values based on the gripping success rates and the constraint satisfaction levels, and an operation is determined based on the evaluation values. However, the predictor 216 may output evaluation values in view of constraint conditions input by the user, and the operation determination unit 218 may determine the operation based on the evaluation values received from the predictor 216. If this is the case, the trained model to be used, which constitutes the predictor 216, may have been trained through machine learning so that, upon receiving: an image that shows the hand and the work target; the current orientation of the robot that can be acquired from the value of the encoder at the joint of the robot; and a movement direction vector, the predictor 216 outputs an evaluation value of when the hand will be moved according to the movement direction vector. In one or more embodiments, the user P inputs a grip recommendation area and/or a grip prohibition area as a condition. However, the user P may additionally input an evaluation value that is used to determine the operation. If this is the case, an evaluation value input by the user P is input to the operation determination unit (output unit) 218 via the second input unit 214. With this configuration, the user P can set any criteria for determining whether or not to perform a gripper open/close operation to grip an object. In this case, the gripping system 200 may output information that is based on the set criteria and the result of determination to a display or the like to present the information to the user P.

Embodiment 2-2: Gripping System (2)

Figure 10:
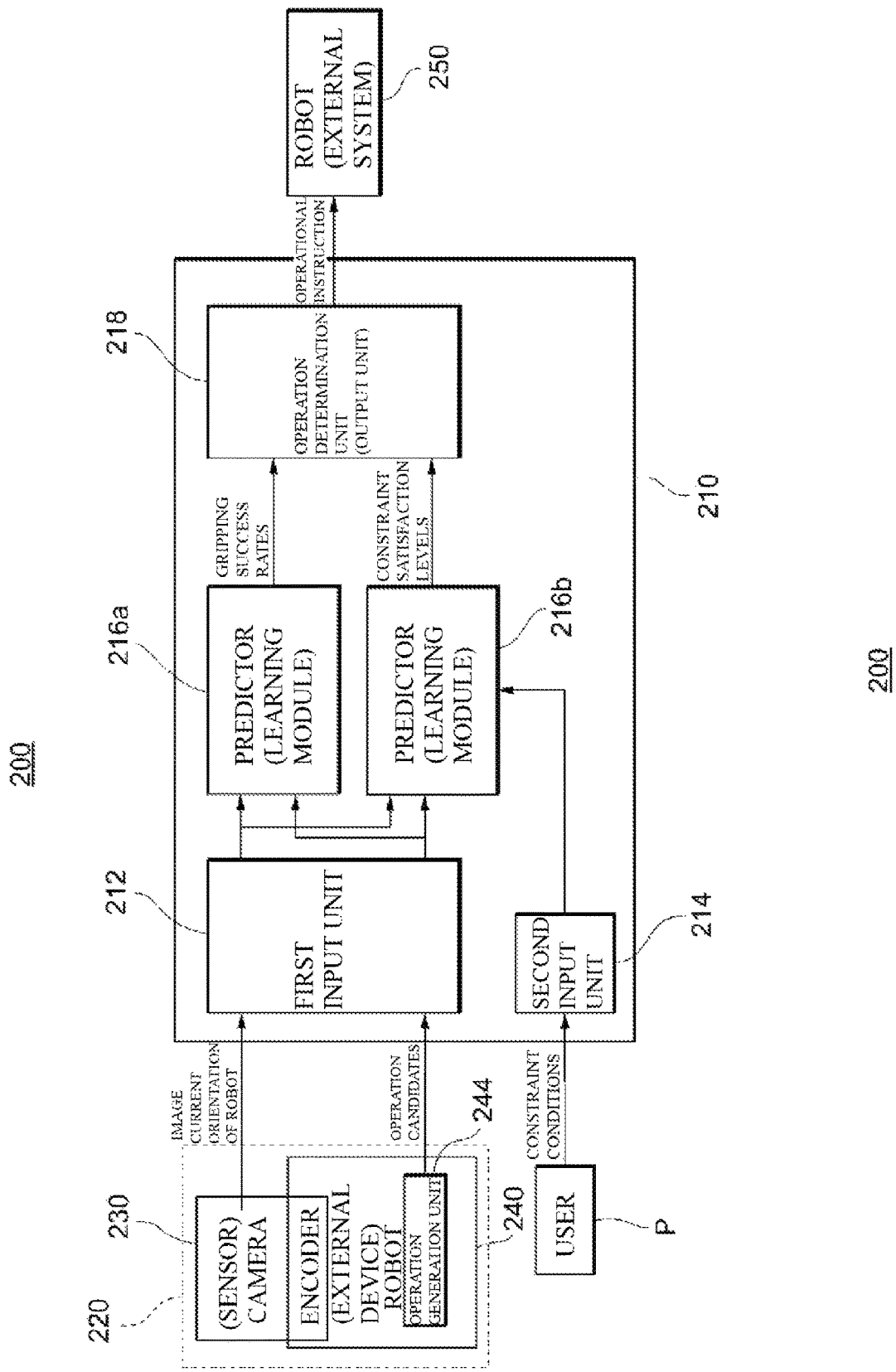
FIG. 10 is a diagram illustrating another embodiment of a gripping system.

FIG. 10 is a diagram showing another embodiment of the gripping system 200. Embodiment 2-1 employs a configuration in which one predictor 216 outputs gripping success rates and constraint satisfaction levels. However, as shown in FIG. 10, it is possible to divide the predictor into one that outputs gripping success rates and one that outputs constraint satisfaction levels.

In this embodiment, a predictor 216a predicts, for a plurality of operation candidates acquired from the robot 240, based on the current position and/or orientation of the robot that are/is calculated based on an image input from the camera 230 and a value input from the encoder 230, gripping success rates of the hand when the hand moves in the respective directions in the current state. A predictor 216b predicts, for a plurality of operation candidates acquired from the robot 240, based on: the current position and/or orientation of the robot that are/is calculated based on an image input from the camera 230 and a value input from the encoder 230; and constraint conditions input by the user, constraint satisfaction levels when the hand moves in the respective directions from the current state.

FIGS. 11A and 11B are diagrams showing examples of gripping success rates that are output from the predictor 216a and constraint satisfaction levels that are output from the predictor 216b. FIG. 11A is a diagram showing examples of a plurality of movement direction vectors (operation candidates) that are input to the predictor 216a, and the respective gripping success rates of the operation candidates that are output from the predictor 216a. FIG. 11B is a diagram showing examples of a plurality of movement direction vectors (operation candidates) that are input to the predictor 216b, and the respective constraint satisfaction levels of the operation candidates that are output from the predictor 216b.

In FIG. 10 again, the operation determination unit 218 acquires the respective gripping success rates of the operation candidates from the predictor 216a, the respective constraint satisfaction level of the operation candidates from the predictor 216b, and combines them to calculate the evaluation value for each operation candidate. Other processing is the same as that of one or more embodiments shown in FIG. 6, and therefore the description thereof is omitted.

By dividing the predictor that outputs gripping success rates and constraint satisfaction levels into two, it is possible to separately perform learning for acquiring a trained model for predicting gripping success rates, and learning for acquiring a trained model for predicting constraint satisfaction levels. For example, a conventional predictor may be used as the predictor 216a for predicting gripping success rates, and the predictor 216b for predicting constraint satisfaction levels that are based on constraint conditions input by the user may be acquired as a trained model through machine learning. In this way, with a configuration in which the predictor 216 included in the gripping system 200 is divided into a plurality of predictors, when adding various constraint conditions, for example, there is no need to re-create the predictor 216 from scratch, and it is only necessary to individually perform machine learning for each constraint condition. Thus, it is possible to reduce the amount of training data that is used to perform machine learning. Also, since it is only necessary to add a trained model that has been acquired for each constraint condition, the predictor 216 can be flexibly configured.

As with the gripping system 200, when the task execution system 10 is applied to a predetermined system and the system has a plurality of predictors 216, the plurality of predictors 216 preferably have at least the following two learning modules. Specifically, the two learning modules are: a first learning module that performs information processing using, as input data, information such as sensor data that is acquired from the external system 20; and a second learning module that performs information processing using, as input data, information that is acquired from the external system 20 and information that has been converted from conditions input by the user P into data that is in a format suitable for processing that is performed by the learning module.

In one or more embodiments, the first learning module is the learning module 216a, which uses sensor data acquired from the sensor 230 as input data, and outputs gripping success rates. The second learning module is the learning module 216b, which uses, as input data, sensor data acquired from the sensor 230 and information that indicates a grip recommendation area and/or a grip prohibition area, which serve as conditions that are input from the user P, and outputs constraint satisfaction levels. In this way, with the configuration including the plurality of learning modules, it is possible to separately form the learning module 216a, which is essential to the execution of the task of gripping a target object using a robot, and the learning module 216b, which outputs information that indicates constraint satisfaction levels in view of constraint conditions on the execution of the task. Thus, it is easier to selectively use an appropriate learning module according to the constraint conditions that are to be imposed on the task.

Embodiment 2-3: Gripping System (3)

Figure 12:
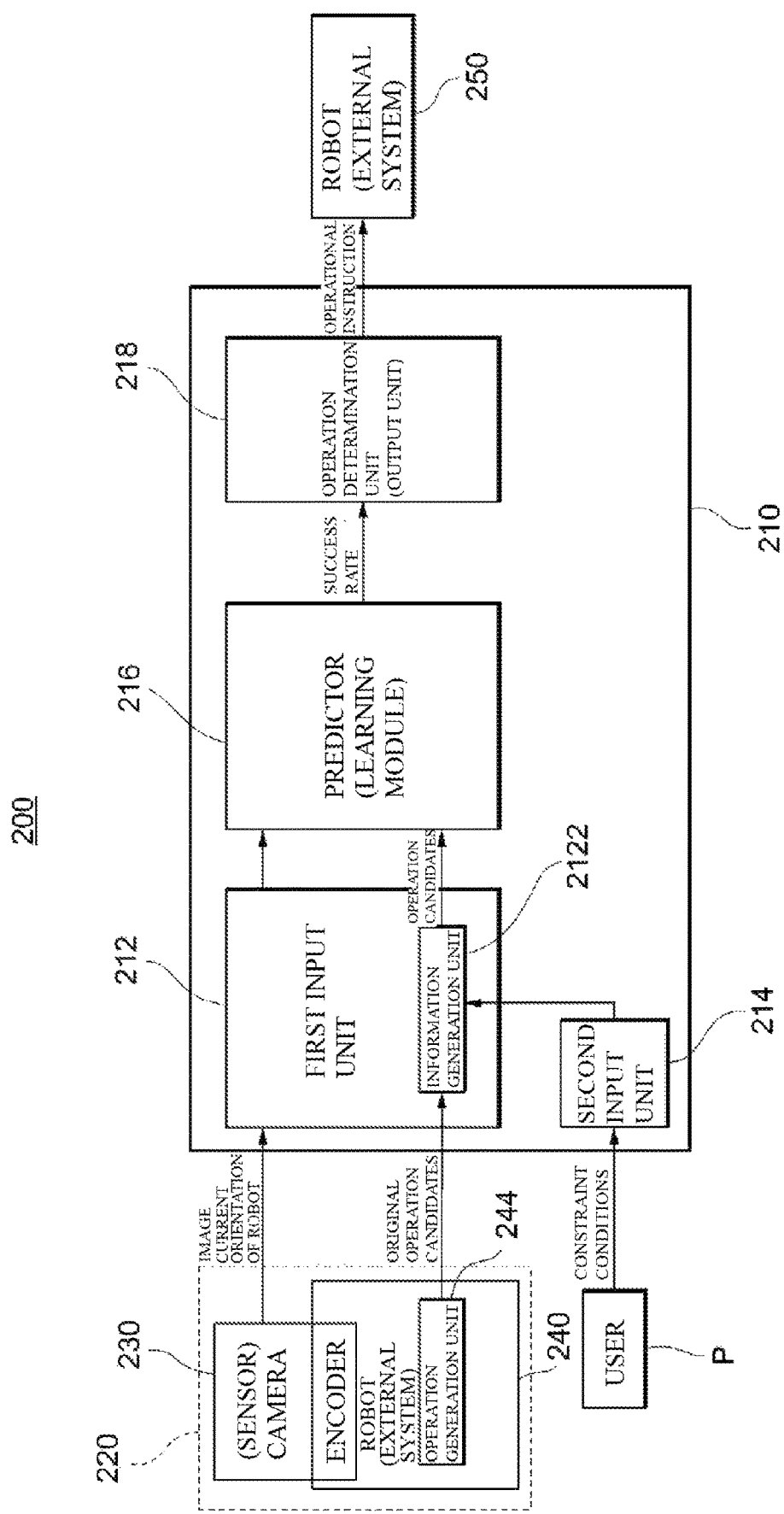
FIG. 12 is a diagram illustrating another embodiment of a gripping system.

FIG. 12 is a diagram showing another embodiment of the gripping system 200. Embodiment 2-1 illustrates a configuration in which a condition input by the user P is input to the predictor 216 via the second input unit 214. However, as shown in FIG. 12, it is possible to employ a configuration in which a condition that has been input by the user P is input to the first input unit 212.

In this embodiment, the first input unit 212 receives a plurality of operation candidates (original operation candidates) generated by the operation generation unit 244 of the robot 240. On the other hand, the first input unit 212 also inputs constraint conditions input by the user P, via the second input unit 214. An information generation unit 2122 of the first input unit 212 determines whether or not each of the original operation candidates acquired from the robot 240 satisfies the constraint conditions input by the user P, and passes operation candidates that satisfy the constraint conditions to a predictor 216. The predictor 216 predicts the gripping success rate for each of the plurality of input operation candidates, and an operation determination unit 318 determines the next operation based on the gripping success rates. Thus, it is possible to exclude operation candidates that do not satisfy the constraint conditions input by the user P before inputting them to the predictor 216, which leads to a reduction in the computation time required for the predictor 216.

Figure 13:
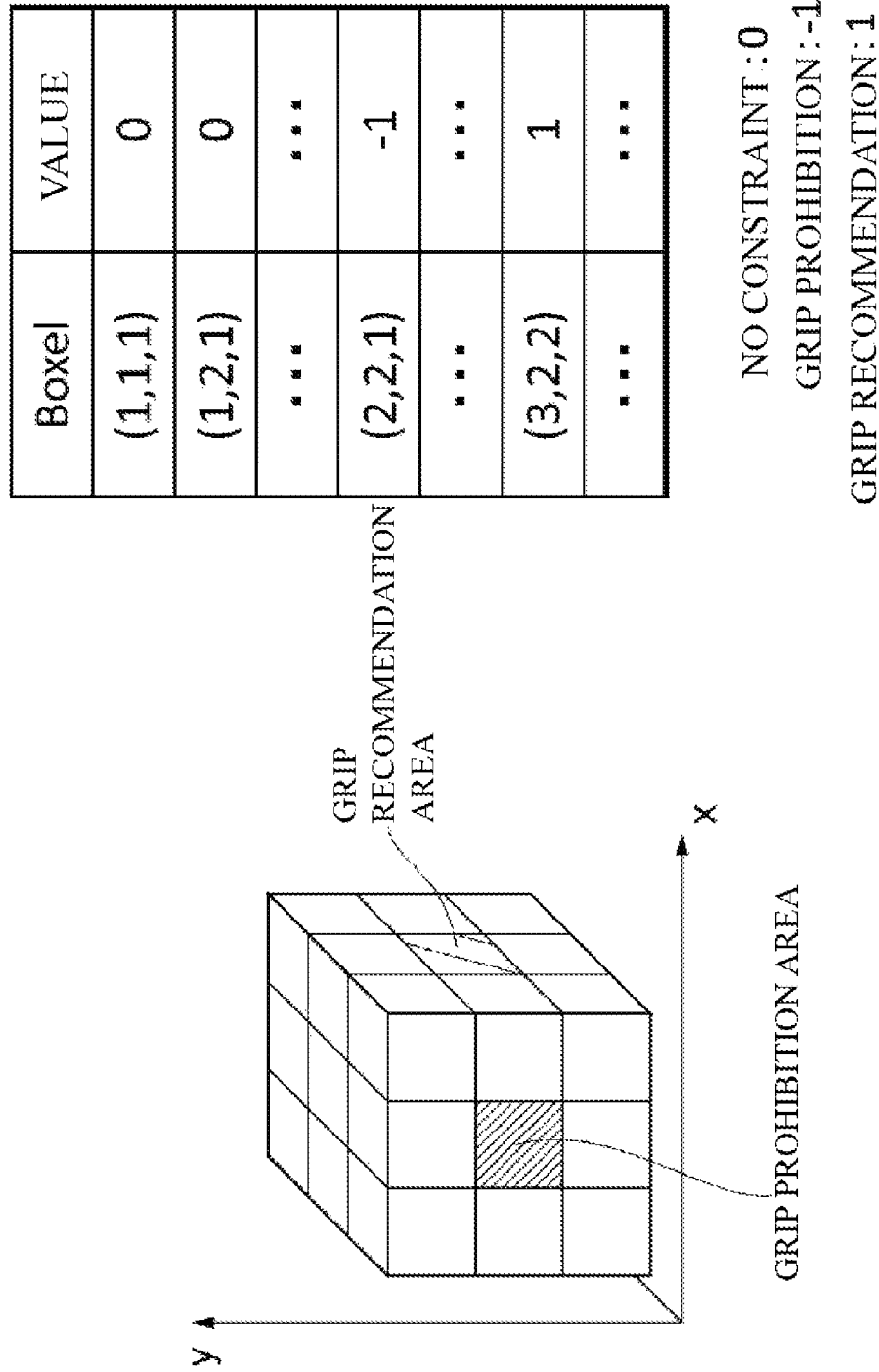
FIG. 13 is a diagram illustrating an example of specification of conditions.

FIG. 13 is a diagram showing an example in which the user P specifies constraint conditions in the gripping system 200 described in Embodiments 2-1 to 2-3. For example, if a grip-target object has an area that is not to be touched (a grip prohibition area) and an area that is desired to be gripped (a grip recommendation area), the user P can specify constraint conditions, on a 3D model of the grip-target object displayed on a display screen of a computer, for example. To acquire a trained model in view of the constraint conditions specified by the user, it is necessary to convert the constraint conditions input by the user, into data that can be input to the learning model, i.e. data suitable for computation that is performed by the learning model. In the example shown in FIG. 13, the constraint conditions specified by the user are converted into feature vectors, and thus the constraint conditions are converted into data in a format that can be input to a neural network. Specifically, a 2D or 3D shape of the grip-target object is displayed on a predetermined display apparatus that is connected to the second input unit 214. At this time, data that has been formed by discretizing the shape of the grip-target object using boxes (voxels) that each have a predetermined size is retained. Numerical vectors that indicate "grippable" and numerical vectors that indicate "ungrippable" are associated with voxels that constitute the grip-target object according to the grip recommendation areas and/or grip prohibition areas input by the user via a predetermined input apparatus that is connected to the second input unit 214. Thus, vectors with which grippable cells and ungrippable cells can be distinguished from each other using the vectors, based on numerical vectors of the grip-target object discretized using voxels and numerical vector data that is associated with the voxels and indicates "grippable" or "ungrippable", and that are in a format that can be input to a neural network, may be generated.

Embodiment 3: Obstacle Avoidance System
(Multi-Jointed Robot)

Figure 14:
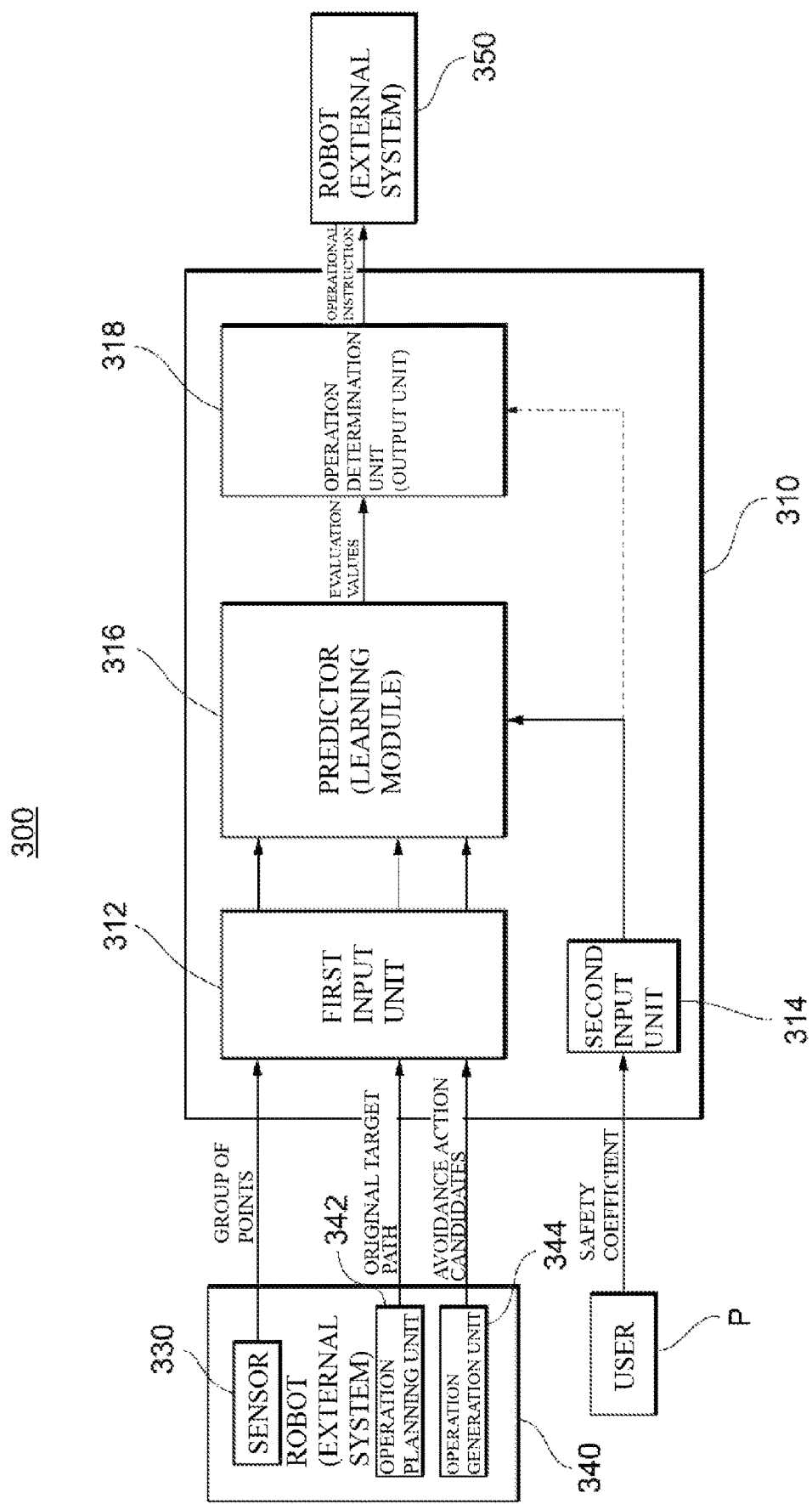
FIG. 14 is a block diagram illustrating an example of a functional configuration in a case where a task execution system is applied to an obstacle avoidance system of a multi-jointed robot.

FIG. 14 is a block diagram showing an example of a functional configuration in a case where the task execution system 10 is applied to an obstacle avoidance system of a multi-jointed robot. An obstacle avoidance system 300 in one or more embodiments is a system that autonomously executes work while avoiding an obstacle in a dynamic environment. It is possible to use a degree of priority balance between the likelihood of avoiding an obstacle and work efficiency as a condition input by the user regarding the requirements of work. That is, the task execution system 10 is configured to allow the user P to specify, as a condition, a degree of balance between the probability of success in avoiding an obstacle, which is the likelihood of avoiding an obstacle, and the work speed, which is work efficiency. Also, it is possible to specify, for example, a degree of importance and a degree of priority, regarding a plurality of indices including "the consumption of energy related to movement", in addition to the likelihood of avoiding an obstacle and a work speed, as conditions that are input by the user P.

The obstacle avoidance system 300 includes a task execution system 310, sensors 330, and a robot 340 or 350. At least one or all of the sensors 330 may be provided in the robot 340. In FIG. 14, although different reference numerals 340 and 350 are assigned to the robot, they actually refer to the same robot.

The task execution system 310 includes a first input unit 312, a second input unit 314, a predictor 316, and an operation determination unit 318. These components respectively correspond to the first input unit 12, the second input unit 14, the learning module 16, and the output unit 18 in FIG. 2.

In one or more embodiments, the obstacle avoidance system 300 is configured such that a group of points, which is information regarding obstacles that exist around the robot and have been subjected to sensing performed by a sensor 330, are input to the predictor 316 via the first input unit 312. It is preferable that information regarding obstacles is expressed as numerical vectors that approximate the shapes of the obstacles, which have been subjected to sensing performed by the sensor 330, using polygons and a group of points. Also, the task execution system 310 acquires an original target path, which is an operation path that an operation planning unit 342 of the robot 340 has created without taking the presence of obstacles into account, and inputs the original target path to the predictor 316 via the first input unit 312. Furthermore, the task execution system 310 acquires avoidance action candidates that have been generated by an operation generation unit 344 of the robot 340 and are used by the robot 340 to avoid obstacles, and inputs the avoidance action candidates to the predictor 316 via the first input unit 312. In addition, a safety coefficient, which is a constraint input by the user P, is input to the predictor 316 via the second input unit 314. Instead of transmitting avoidance action candidates for avoiding obstacles, the operation generation unit 344 may transmit operation candidates that indicate in which direction the robot 340 should move from the current orientation.

The predictor 316 predicts an avoidance success rate and a target deviation rate for each of the avoidance action candidates, and outputs evaluation values in view of the safety coefficient specified by the user. The operation determination unit 318 determines an avoidance action based on the evaluation values, and outputs an operational instruction for realizing the determined avoidance action, to the robot 350. The robot 350 executes an avoidance action based on the operational instruction received from the task execution system 310. In addition, the obstacle avoidance system 300 may display information that is based on the safety coefficient specified by the user, on the display or the like, to present the information to the user.

Also, the predictor 316 may predict an avoidance success rate and a target deviation rate for each of the plurality of avoidance action candidates, and output them to the operation determination unit 318. At this time, the safety coefficient specified by the user is input from the second input unit 314 to the operation determination unit 318 (the dashed arrow in FIG. 14). The operation determination unit 318 may calculate an evaluation value in view of the safety coefficient specified by the user, for each of the plurality of avoidance action candidates, based on the avoidance success rates and the target deviation rates, and determine an avoidance action based on the evaluation values.

FIG. 15 is a diagram showing examples of original target path candidates that are input to the predictor 316, and the respective avoidance success rates and target deviation rates of target path candidates output from the predictor 316. In the figure, shafts 1, 2, ..., and 6 are numbers assigned to motors that constitute the joints of a six-shaft multi-jointed robot. Signs v1, v2, ..., and vn each indicate the type of operation candidate (target path) of the robot. From among signs that each indicate an operation, an arrow shows the direction of rotation of a motor, and φ indicates that a motor does not move. Specifically, "↑" indicates that the motor is moved in the forward direction, "↓" indicates that the motor is moved in the reverse direction, and "φ" indicates that the motor is not to be moved. The direction of rotation of a motor may be expressed as a numerical vector ($-1$ to $+1$), and the amount of rotation may be continuously expressed in combination with the direction of rotation. Also, a numerical vector may be used to express the acceleration (angular acceleration) of a motor instead of the direction of rotation of a motor.

An avoidance success rate P indicates the probability of success in avoiding an obstacle when the robot performs an operation vn. A target deviation rate Q is an index that indicates, when the robot performs the operation vn, how close the resulting path is to the normal path (the target path) in a case where there are no obstacles. The target deviation rate Q is, for example, an index that indicates "1" when the path perfectly matches the operation path in a case where there are no obstacles, and indicates "0" when only the start points and the end points match and the intermediate paths do not match at all.

For example, in FIG. 15, the operation candidate v1 indicates an operation that is performed to rotate the joint of the shaft 1 in the forward direction and not move the joints of the remaining shafts 2 to 6, and FIG. 15 shows that the avoidance success rate and the target deviation rates when the operation candidate v1 is operated as the next operation are respectively 0.2 and 0.8. That is, in the current state, the predictor 316 outputs 0.2 and 0.8 as the avoidance success rate and the target deviation rate of the operation candidate v1, respectively.

In one or more embodiments, the user P inputs a safety coefficient α. Which operation candidate vn is to be selected is determined based on this safety coefficient. For example, when calculating an evaluation value K of an operation, using an evaluation formula: K=avoidance success rate×α (safety coefficient)+target deviation rate×(1−α), the user can determine which is to be regarded as more important, the avoidance success rate or the target deviation rate, by adjusting the safety coefficient α. For example, in the example in FIG. 15, if the safety coefficient α is set to 1, the operation candidate v2 with a high avoidance success rate will be selected, and if the safety coefficient α is set to 0, the operation candidate v1 with a high target deviation rate will be selected. In this way, in one or more embodiments, an input by a person is additionally used, and thus a user can specify a tradeoff between safety and efficiency on the site.

Note that the predictor 316 is constituted by a trained model. With a learner, it is possible to acquire a trained model that outputs a desirable result, by performing training using a reward function with which the closer to a value input by a person the ratio between the avoidance success rate in a case where an avoidance action candidate is executed and the rate of deviation from the original target path (work target operation) is, the higher a reward that can be obtained is.

Embodiment 4: Obstacle Avoidance System
(Multi-Agent System)

Figure 16:
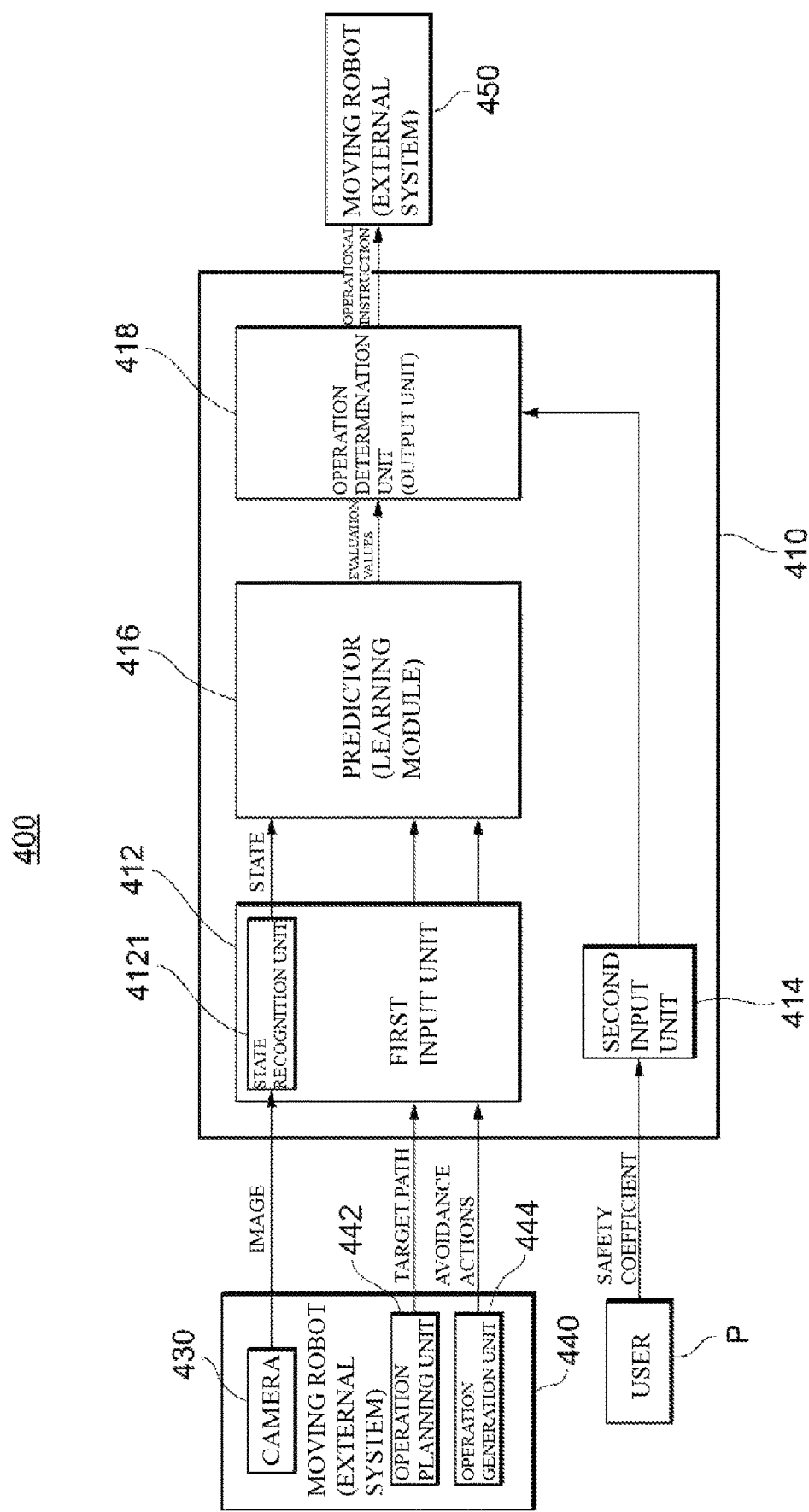
FIG. 16 is a block diagram illustrating an example of a functional configuration in a case where a task execution system is applied to an obstacle avoidance system of a multi-agent system.

FIG. 16 is a block diagram showing an example of a functional configuration in a case where the task execution system 10 is applied to a multi-agent obstacle avoidance system. An obstacle avoidance system 400 according to one or more embodiments is a system for determining paths through which a plurality of moving robots (agents) in the same space such as a factory or a warehouse can arrive at their respective destinations in the shortest time without colliding with each other, and includes a task execution system 410 and a moving robot 440 or 450. The moving robot 440 is provided with a camera 430. In FIG. 16, although different reference numerals 440 and 450 are assigned to the moving robot, they actually refer to the same moving robot.

The task execution system 410 includes a first input unit 412, a second input unit 414, a predictor 416, and an operation determination unit 418. These components respectively correspond to the first input unit 12, the second input unit 14, the learning module 16, and the output unit 18 in FIG. 2. In one or more embodiments, the first input unit 412 includes a state recognition unit 4121. This component corresponds to the state recognition unit 121 in FIG. 2.

In the obstacle avoidance system 400 in one or more embodiments, an image of an area around the moving robot 440, captured by the camera 430, is input to the state recognition unit 4121 of the first input unit 412. The state recognition unit 4121 recognizes the state of the moving robot 440 based on the image acquired from the camera 430, and outputs a state vector to the predictor 416. Also, the task execution system 410 acquires an original target path (target vector) created by an operation planning unit 442 of the robot 440, and inputs the original target path to the predictor 416 via the first input unit 412. Furthermore, the task execution system 410 acquires avoidance action candidates that have been generated by an operation generation unit 444 of the robot 440 and are used by the robot 440 to avoid colliding with other moving robots, and inputs the avoidance action candidates to the predictor 416 via the first input unit 412.

Figure 17:
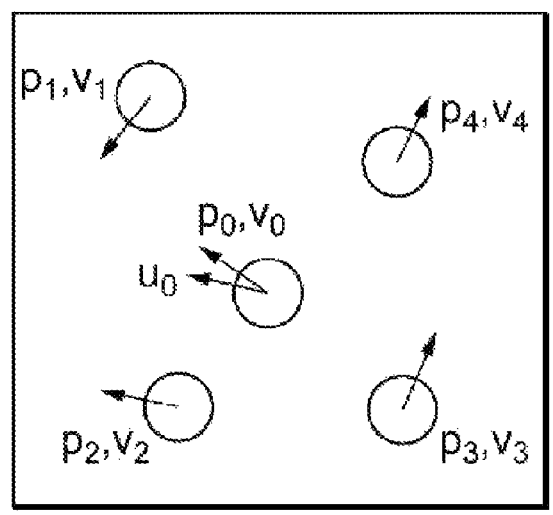
FIG. 17 is a schematic diagram illustrating a multi-agent system.

FIG. 17 is a schematic diagram of a multi-agent system according to one or more embodiments. In the example shown in the figure, there are five moving robots in total, and each moving robot has a state vector (p,v) that indicates the position and speed thereof. Also, each moving robot has a target vector {u0} that indicates the target position thereof.

In FIG. 16 again, the predictor 416 calculates, based on the target vector {u0}, the state vector {p0,v0,p1,v1,p2,v2,p3,v3}, and the plurality of avoidance action candidates {↑,↓,←,→,φ} input from the first input unit 412, an evaluation value for each of the plurality of avoidance action candidates, and outputs the evaluation values to the operation determination unit 418.

In addition to the evaluation values, a safety coefficient input by the user P is input to the operation determination unit 418 via the second input unit 414. The operation determination unit 418 determines an avoidance action based on the evaluation values and the safety coefficient, and outputs an operational instruction to the robot 450. In addition, the obstacle avoidance system 400 may display information that is based on the safety coefficient input by the user, on the display or the like, to present the information to the user.

Each moving robot needs to determine the optimum action based on the current state thereof and the current states of moving robots therearound. It is possible to acquire such an action policy through machine learning.

Embodiment 5: Person Search System

Figure 18:
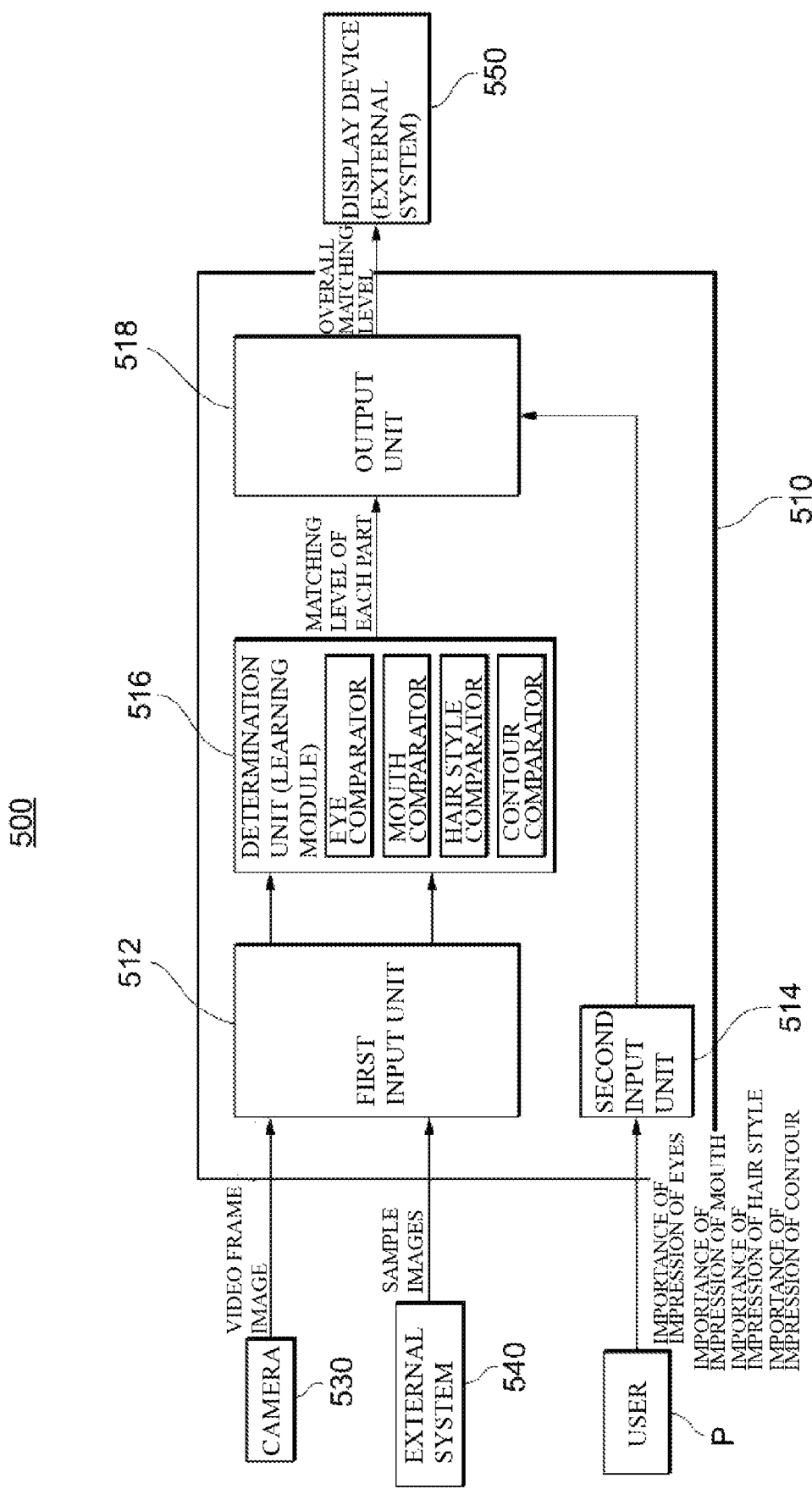
FIG. 18 is a block diagram illustrating an example of a functional configuration in a case where a task execution system is applied to a person search system.

FIG. 18 is a block diagram showing an example of a functional configuration in a case where the task execution system 10 is applied to a person search system. A person search system 500 according to one or more embodiments is a system that extracts a specific person that is indicated by a sample, from a surveillance image. One or more embodiments allows the user P to effectively narrow down people by inputting a body part that the user P regards as more important.

The person search system 500 includes a task execution system 510, a surveillance camera 530 that captures a video to acquire frame images, an external system 540 that stores sample images, and a display device 550 for displaying processing results. The task execution system 510 includes a first input unit 512, a second input unit 514, a determination unit 516, and an output unit 518.

In the person search system 500 in one or more embodiments, a video frame image captured by the surveillance camera 530 is input to the determination unit 516 via the first input unit 512. Also, a sample image stored in the external system 540 is input to the determination unit 516 via the first input unit 512.

The determination unit 516 determines whether or not a specific person has been captured, based on the acquired video frame image and the sample image. In one or more embodiments, the determination unit 516 is constituted by a plurality of learning modules. Each learning module has been trained through machine learning so as to be able to determine a matching level by comparing predetermined body parts in the images. In this example, the determination unit 516 includes four comparators, which are respectively constituted by a neural network for comparing eyes, for comparing mouths, for comparing hair styles, and for comparing contours. The four comparators determine the respective matching levels of the body parts (eyes, mouths, hair styles, and contours) by comparing a person captured in the image input from the camera 530 with a person in the sample image, and outputs the respective matching levels of the body parts.

The output unit 518 acquires the respective matching levels of the body parts from the determination unit 516. On the other hand, the output unit 518 receives weights input by the user P regarding the body parts, respectively, from the second input unit 514, calculates an overall matching level in view of the respective weights of the body parts, and outputs the overall matching level to the display device 550. Also, the person search system 500 may output information based on the weights input by the user P regarding the body parts, respectively, to the display device 550.

FIG. 19 is a diagram showing an example of a matching level and a weight, for each body part, according to one or more embodiments. The weight of each body part has been input by the user. The output unit 518 calculates an overall matching level according to a predetermined logic, based on the respective matching levels of the body parts output from the determination unit, and the respective weights of the body parts input by the user.

Embodiment 6: Inverse Kinematics Model

Figure 20:
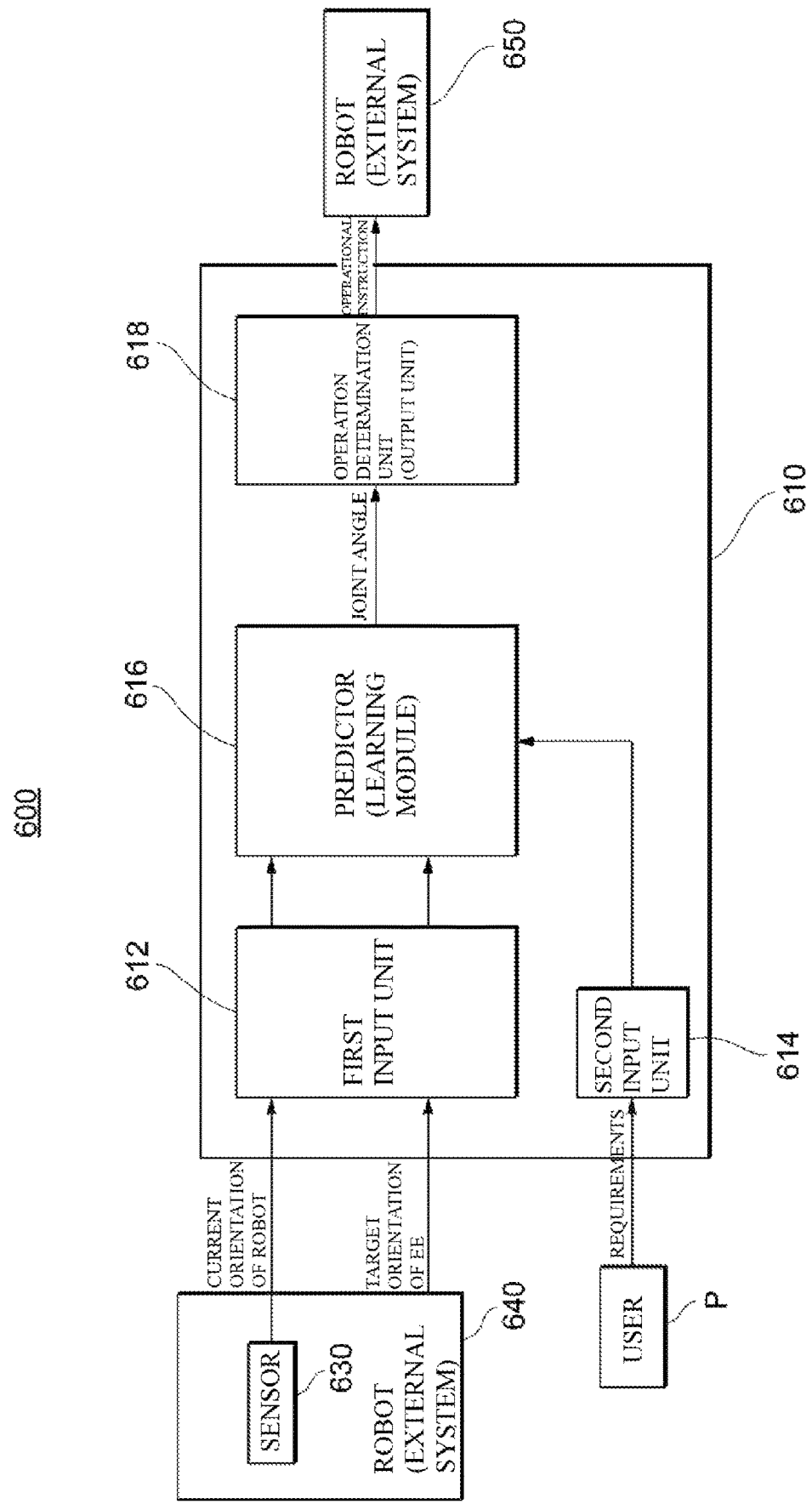
FIG. 20 is a block diagram illustrating an example of a functional configuration in a case where a task execution system is applied to an inverse kinematics model.
Figure 21:
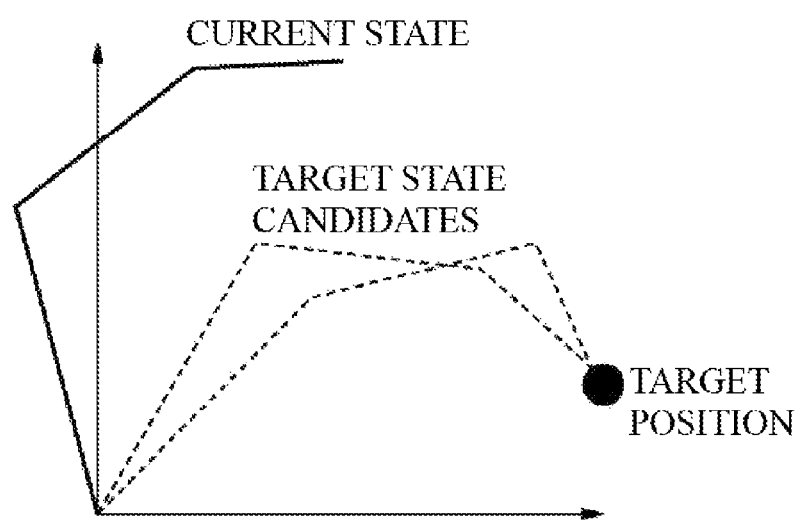
FIG. 21 is a diagram illustrating an example in a case where there are a plurality of solutions in inverse kinematics.

FIG. 20 is a block diagram showing an example of a functional configuration in a case where the task execution system 10 is applied to an inverse kinematics model. FIG. 21 is a diagram showing an example in a case where there are a plurality of solutions in inverse kinematics.

An inverse kinematics control system 600 in one or more embodiments is a system that is, upon being provided with an orientation of an end effector such as a hand or a gripper, able to output a joint angle that realizes the orientation. When an orientation of an end effector is provided, there may be a plurality of joint angles that realizes the orientation, as shown in FIG. 21. In one or more embodiments, an appropriate solution is output based on a condition specified by the user such as the condition that the moving distance from the current orientation is the minimum.

As shown in FIG. 20, the inverse kinematics control system 600 according to one or more embodiments includes a task execution system 610, sensors 630, and a robot 640 or 650. At least one or all of the sensors 630 may be provided in the robot 640. In FIG. 20, although different reference numerals 640 and 650 are assigned to the robot, they actually refer to the same robot. The task execution system 610 includes a first input unit 612, a second input unit 614, a predictor 616, and an operation determination unit 618.

In one or more embodiments, the task execution system 610 acquires the current orientation of the robot 640 from the sensors 630 such as an encoder, and inputs the current orientation to the predictor 616 via the first input unit 612. Also, the task execution system 610 acquires a target orientation of the end effector from an operation planning unit (not shown) of the robot 640, and inputs the target orientation to the predictor 616 via the first input unit 612. In addition, the task execution system 610 acquires a condition that has been input by the user P, and inputs the condition to the predictor 616 via the second input unit 614.

The predictor 616 is constituted by a trained model, and outputs a joint angle that realizes the target orientation, based on the current orientation of the robot 640 and the target orientation of the end effector. If there are a plurality of solutions, the predictor 616 selects an appropriate solution based on the condition input by the user P, and outputs the solution (joint angle) thus selected.

The operation determination unit 618 generates an operational instruction based on the joint angle received from the predictor 616, and outputs the operational instruction to the robot 650. The robot 650 operates based on the operational instruction thus received, so that the robot 650 can control the orientation of the end effector according to the condition specified by the user P. The inverse kinematics control system 600 may output information that is based on a condition input by the user P, to a display or the like to present the information to the user P.

In one or more embodiments, it is possible to acquire the trained model that constitutes the predictor 616, by performing supervised learning through which the learner is supplied with sets of an orientation of an end effector and a joint angle corresponding thereto, as training data. Specifically, it is possible to generate a solution training data set by generating combinations of various joint angles and computing orientations of the end effector corresponding thereto, using forward kinematics.

Furthermore, if there are a plurality of combinations of joint angles that correspond to the orientation of the end effector, a predetermined evaluation index is set, and training data with which the solution thereof maximizes the evaluation index is generated. Through supervised learning using the training data thus generated, it is possible to acquire a trained model that outputs a solution that maximizes a specified evaluation function. The evaluation function can be expressed by a combination of a positioning accuracy and a movement cost, for example. The positioning accuracy is a difference between the desired orientation of the end effector and the orientation corresponding to the joint angle, and the movement cost can be calculated as the amount of movement from the current orientation. In addition, a distance from a singular point may be used as the evaluation index.

Note that the present invention is not limited to the above-described embodiments, and may be carried out in various forms within the scope of the spirit of the present invention. Therefore, the above-described embodiments are merely illustrative in all aspects, and are not to be construed as limiting. For example, the above-described processing steps may be partially omitted, or modified so as to be performed in any order or in parallel, to the extent that inconsistencies in terms of contents of processing do not arise. Also, functional configurations and hardware configurations in one or more embodiments are merely examples, and are not limited to those shown in the figures.

Programs that execute various kinds of processing described in the present specification may be stored in a recording medium. For example, by installing the above-described programs to a computer, it is possible to enable the computer to function as the task execution system 10. Here, the recording medium in which the above-described programs are stored may be a non-transitory recording medium. The non-transitory recording medium is not limited to a specific medium, and may be a recording medium such as a CD-ROM, for example.

At least one or all of the above-described embodiments can be described as, but are not limited to, the following appendixes.

APPENDIX 1

A system that is provided with at least one memory and at least one hardware processor that is connected to the memory, and uses a learning module that includes a trained model that has been subjected to predetermined training through machine learning, or a model that is equivalent to the trained model in terms of an input-output relationship, to realize execution of a predetermined task, wherein the hardware processor uses a first input unit to receive information that is acquired from one or more external systems, and generate at least a portion of information that is to be input to the learning module, uses an output unit to acquire information that is output from the learning module, and generate information that is to be output from the system, the information output from the system being information based on which execution of a predetermined task is to be realized, and receives an input from a user so that information that is based on the input from the user is input to at least one of the first input unit, the learning module, and the output unit, and information that is output from the output unit varies based on the input from the user.

APPENDIX 2

A method for controlling a task execution system that uses a learning module that includes a trained model that has been subjected to predetermined training through machine learning, or a model that is equivalent to the trained model in terms of an input-output relationship, to realize execution of a predetermined task, the method comprising:

a step in which at least one hardware processor uses a first input unit to receive information that is acquired from one or more external systems, and generate at least a portion of first information that is to be input to the learning module;

a step in which the hardware processor uses the learning module to output second information for execution of a predetermined task, based on at least the first information thus generated;

a step in which the hardware processor uses an output unit to acquire at least the second information thus output, and generate third information that is to be output from the system; and a step that is performed by the hardware processor substantially in parallel with at least one of the generation of the first information, the output of the second information, and the generation of the third information, to receive an input from a user, input information that is based on the input from the user to at least one of the first input unit, the learning module, and the output unit, and vary information that is to be output from the output unit based on the input from the user.

The invention claimed is:

1. A task execution system for executing a predetermined task, the task execution system comprising a processor configured with a program to perform operations comprising:

operation as a learning module comprising: a trained model that has been subjected to predetermined training through machine learning; or a model that is equivalent to the trained model in terms of an input-output relationship;

operation as a first input unit configured to receive information acquired from one or more external systems, and generate at least a portion of information to be input to the learning module;

operation as an output unit configured to acquire information output from the learning module, and generate information to be output from the system, the information output from the system comprising information based on which execution of the predetermined task is to be realized; and substantially in parallel with the operation as at least one of the learning module, the operation as the first input unit, and the operation as the output unit, operation as a second input unit configured to receive a user input so that information based on the user input is input to at least one of: the first input unit; the learning module; and the output unit, wherein the learning module adjusts the trained model based on the user input such that the information output from the output unit varies based on the user input.

2. The system according to claim 1, wherein the processor is configured with the program such that:

operation as the second input unit comprises operation as the second input unit that receives a condition regarding the predetermined task; and operation as the output unit comprises operation as the output unit that outputs information based on the received condition.

3. The system according to claim 2, wherein the information output from the output unit partially comprises information that is to be presented according to the condition.

4. The system according to claim 1, wherein the processor is configured with the program such that operation as the learning module comprises operation as the learning module comprising a neural network.

5. The system according to claim 1, wherein the processor is configured with the program such that operation as the learning module comprises operation as the learning module that generates the information to be output to the output unit based on information input from the first input unit and information input from the second input unit.

6. The system according to claim 1, wherein the one or more external systems comprise a camera, the user input received by the second input unit comprises a condition regarding an inspection criterion, and the processor is configured with the program such that operation as the output unit comprises operation as the output unit that uses an image of a target object captured by the camera to output an inspection result of the target object based on the inspection criterion.

7. The system according to claim 1, the system controlling operations of a robot based on information output from the output unit, wherein the one or more external systems comprise a sensor configured to detect a current orientation of the robot, the user input received by the second input unit comprises a condition regarding a constraint on the operations of the robot, and the processor is configured with the program such that operation as the output unit comprises operation as the output unit that outputs information for controlling the operations of the robot based on the current orientation of the robot and the condition.

8. The system according to claim 1, the system controlling operations of a robot based on information output from the output unit, wherein the one or more external systems comprise a sensor configured to detect at least one of a current position and a current orientation of the robot, the user input received by the second input unit comprises a condition regarding safety of the robot in avoiding an obstacle, and the processor is configured with that program such that operation as the output unit comprises operation as the output unit that outputs information for controlling the operations of the robot based on the current position of the robot and the condition.

9. The system according to claim 1, wherein the one or more external systems comprise a camera, the user input received by the second input unit comprises a condition regarding a part of a human body, and the processor is configured with the program such that operation as the output unit comprises operation as the output unit that uses an image of a person captured by the camera to determine a matching level with a specific target image based on the condition input.

10. A training apparatus that trains the learning module included in the system according to claim 1, comprising:

a learning control unit configured to train the learning module based on training data comprising first training data acquired from one or more external systems, and second training data comprising data in a same format as a condition input when execution of the predetermined task is to be realized.

11. A method for realizing execution of a predetermined task using a system comprising a learning module, the learning module comprising a trained model that has been subjected to predetermined training through machine learning, or a model that is equivalent to the trained model in terms of an input-output relationship, the method comprising:

receiving information acquired from one or more external systems, and generating at least a portion of information to be input to the learning module, by a first input unit;

outputting predetermined information based on at least the generated information, by the learning module;

acquiring at least the output information, and generating information to be output from the system, the information output from the system comprising information based on which execution of a predetermined task is to be realized, by an output unit; and receiving, substantially in parallel with at least one of the receiving and the generating by the first input unit, the outputting by the learning module, and the acquiring and the generating by the output unit, a user input so that information based on the user input is input to at least one of the first input unit, the learning module, and the output unit, wherein the learning module adjusts the trained model based on the user input such that information output from the output unit varies based on the user input.

12. A method for training a learning module that is included in the system used by the method according to claim 11, comprising:

training the learning module through machine learning based on training data comprising first training data acquired from one or more external systems, and second training data comprising data in a same format as a condition input when execution of the predetermined task is to be realized.

13. A non-transitory computer-readable storage medium storing a program for causing a computer comprising a learning module, the learning module comprising a trained model that has been subjected to predetermined training through machine learning to realize execution of a predetermined task, or a model that is equivalent to the trained model in terms of an input-output relationship, to perform operations comprising:

receiving information acquired from one or more external systems, and generating at least a portion of information to be input to the learning module;

outputting, by the learning module, predetermined information based on at least the generated information;

acquiring at least the output information, and generating information to be output from the computer, the information output from the computer comprising information based on which execution of a predetermined task is to be realized; and receiving, substantially in parallel with at least one of the receiving and the generating, the outputting, and the acquiring and the generating, a user input wherein the learning module adjusts the trained model based on the user input such that information that realizes execution of the predetermined task varies based on the user input.

14. A non-transitory computer-readable storage medium storing a program for training the learning module included in the computer according to claim 13, comprising:

causing the computer to train the learning module through machine learning based on training data comprising first training data acquired from one or more external systems, and second training data comprising data in a same format as a condition input when execution of the predetermined task is to be realized.

* * * * *